(12) United States Patent
Kim et al.

(10) Patent No.: US 11,525,627 B2
(45) Date of Patent: Dec. 13, 2022

(54) REFRIGERATOR

(71) Applicant: LG ELECTRONICS INC., Seoul (KR)

(72) Inventors: Jaehong Kim, Seoul (KR); Heeyeon Choi, Seoul (KR); Hyunseok Shin, Seoul (KR); Yongsuk Lee, Seoul (KR); Soungmin Im, Seoul (KR); Kamin Lee, Seoul (KR); Hangil Jeong, Seoul (KR); Hyoeun Kim, Seoul (KR); Hyejeong Jeon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/352,124

(22) Filed: Jun. 18, 2021

(65) Prior Publication Data

US 2022/0325945 A1 Oct. 13, 2022

(51) Int. Cl.
*F25D 29/00* (2006.01)
*H04N 7/18* (2006.01)
(Continued)

(52) U.S. Cl.
CPC ............ *F25D 29/00* (2013.01); *G06T 7/74* (2017.01); *G06V 20/00* (2022.01); *H04N 5/247* (2013.01); *H04N 7/188* (2013.01); *G06V 20/68* (2022.01)

(58) Field of Classification Search
None
See application file for complete search history.

(56) References Cited

U.S. PATENT DOCUMENTS

2013/0302483 A1* 11/2013 Riefenstein .......... G06K 9/6201
382/110
2014/0252091 A1* 9/2014 Morse .................. G06F 16/70
312/404
(Continued)

FOREIGN PATENT DOCUMENTS

CN 108932512 12/2018
JP 2019168134 10/2019
(Continued)

OTHER PUBLICATIONS

PCT International Application No. PCT/KR2021/004328, International Search Report dated Jan. 3, 2022, 10 pages.

*Primary Examiner* — Eileen M Adams
(74) *Attorney, Agent, or Firm* — Lee, Hong, Degerman, Kang & Waimey PC

(57) ABSTRACT

According to an embodiment of the present disclosure, a refrigerator may include a storage compartment, a door, one or more cameras provided in the door, a global DB configured to store a plurality of default food identification items and a plurality of default product names respectively corresponding to the plurality of default food identification items, and a local DB configured to store edited product names and a food identification item corresponding to the edited product names, and a processor configured to photograph an internal image of the storage compartment, obtain one or more food identification items from the photographed internal image, and if the obtained one or more food identification items are stored in the local DB, recognize one or more product names of the obtained one or more food identification items as product names of the food identification items stored in the local DB.

19 Claims, 32 Drawing Sheets

(51) Int. Cl.
  *G06T 7/73*    (2017.01)
  *H04N 5/247*   (2006.01)
  *G06V 20/00*   (2022.01)
  *G06V 20/68*   (2022.01)

(56) References Cited

U.S. PATENT DOCUMENTS

| | | | | |
|---|---|---|---|---|
| 2017/0219279 | A1* | 8/2017 | Chae | F25D 11/00 |
| 2020/0348077 | A1* | 11/2020 | Lee | F25D 29/00 |
| 2021/0014461 | A1 | 1/2021 | Kang et al. | |
| 2022/0114404 | A1* | 4/2022 | Bhogal | G06K 9/6218 |

FOREIGN PATENT DOCUMENTS

| | | |
|---|---|---|
| KR | 1020190090290 | 8/2019 |
| KR | 1020190108049 | 9/2019 |
| KR | 1020200106479 | 9/2020 |

* cited by examiner

· Reference value is set in range of D_centroid < a < D_max

REFRIGERATOR

CROSS-REFERENCE TO RELATED APPLICATION(S)

Pursuant to 35 U.S.C. § 119 (a), this application claims the benefit of an earlier filing date and right of priority to International Application No. PCT/KR2021/004328 filed on Apr. 7, 2021, the contents of which are hereby incorporated by reference herein in its entirety.

BACKGROUND OF THE INVENTION

1. Field of the Invention

The present disclosure relates to a refrigerator, and more particularly, to a capable of photographing the inside of the refrigerator and recognizing food based on the photographed image.

2. Discussion of the Related Art

A refrigerator is an apparatus for supplying cold air generated by a freezing cycle to a refrigerator compartment and a freezer compartment to maintain the freshness of various foods for a long time.

In general, the refrigerator is configured to include a main body having a refrigerator compartment and a freezer compartment for storing food, and doors rotatably coupled to one side of the main body to open and close the refrigerator compartment and the freezer compartment.

The refrigerator compartment is divided into a plurality of spaces by shelves or the like to efficiently receive and store storage items according to the type of the storage items. The refrigerator compartment is provided with a storage compartment for storing meat and fish in the upper region, and a storage compartment for storing vegetables and fruits in the lower region.

On the other hand, in recent years, as the demand for advanced refrigerators is gradually increasing due to the improvement of the living environment, a display device is provided in the door of the refrigerator to provide information on the refrigerator and to control the refrigerator.

Moreover, in recent years, two doors are provided as doors of the refrigerator compartment, thus expanding the storage space.

In order for a user to grasp the current storage items of the refrigerator, the user has to open a refrigerator door directly and look at the inside thereof.

To this end, a refrigerator is conventionally provided with a camera on the ceiling of the refrigerator to provide information about a storage state of the refrigerator.

However, when the door of the refrigerator compartment is provided with two doors, there is a problem in that the food storage state of the door cannot be properly grasped by only the camera provided on the ceiling.

In addition, conventionally, the product name of the food is recognized as a predetermined product name, and cannot be modified to suit the user's preference. So that food management cannot be performed to suit the user's preference.

SUMMARY OF THE INVENTION

An object of the present disclosure is to provide a refrigerator capable of modifying a name of food to suit a user's preference.

An object of the present disclosure is to provide a refrigerator capable of recognizing the name of any one food product as a pre-modified name even when a plurality of identical food products are stocked.

A refrigerator according to an embodiment of the present disclosure may photograph an internal image of the storage compartment through the more or more cameras, obtain one or more food identification items from the photographed internal image, and when the obtained one or more food identification items are stored in the local DB, recognize one or more product names of the obtained one or more food identification items as product names of the food identification items stored in the local DB.

The refrigerator according to the embodiment of the present may, when there are a plurality of identical food identification items stored in the local DB among the plurality of food identification items obtained from the photographed internal image, recognize a product name of one of a plurality of identical food items corresponding to the plurality of identical food identification items as a product name stored in the local DB.

According to the embodiment of the present disclosure, a user may perform proactive food management by modifying the name of the food according to his or her preference.

According to an exemplary embodiment of the present disclosure, even if a plurality of identical foods is stocked, the product name of one food desired by the user is recognized differently, and food management according to the user's preference may be performed.

DETAILED DESCRIPTION OF THE PREFERRED EMBODIMENTS

Figure 1:
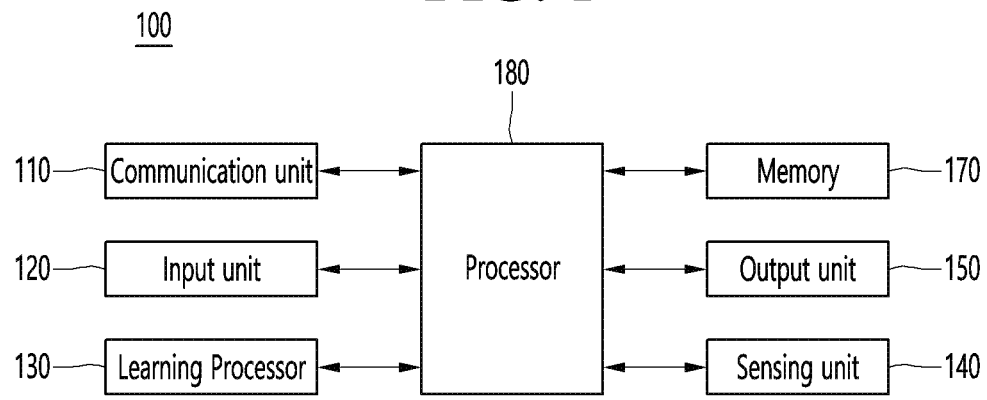
FIG. 1 illustrates an AI device according to an embodiment of the present disclosure.

Artificial intelligence refers to the field of studying artificial intelligence or methodology for making artificial intelligence, and machine learning refers to the field of defining various issues dealt with in the field of artificial intelligence and studying methodology for solving the various issues.

Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network may be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer if the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input device 120, a learning processor 130, a sensing device 140, an output device 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input device 120 may acquire various kinds of data.

In this case, the input device 120 may include a camera for inputting a video signal, a microphone for receiving an audio signal, and a user input device for receiving information from a user. The camera or the microphone may be treated as a sensor, and the signal acquired from the camera or the microphone may be referred to as sensing data or sensor information.

The input device 120 may acquire a learning data for model learning and an input data to be used if an output is acquired by using learning model. The input device 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

In this case, the learning processor 130 may perform AI processing together with the learning processor 240 of the AI server 200.

In this case, the learning processor 130 may include a memory integrated or implemented in the AI device 100. Alternatively, the learning processor 130 may be implemented by using the memory 170, an external memory directly connected to the AI device 100, or a memory held in an external device.

The sensing device 140 may acquire at least one of internal information about the AI device 100, ambient environment information about the AI device 100, and user information by using various sensors.

Examples of the sensors included in the sensing device 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output device 150 may generate an output related to a visual sense, an auditory sense, or a haptic sense.

In this case, the output device 150 may include a display device for outputting time information, a speaker for outputting auditory information, and a haptic module for outputting haptic information.

The memory 170 may store data that supports various functions of the AI device 100. For example, the memory 170 may store input data acquired by the input device 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

If the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
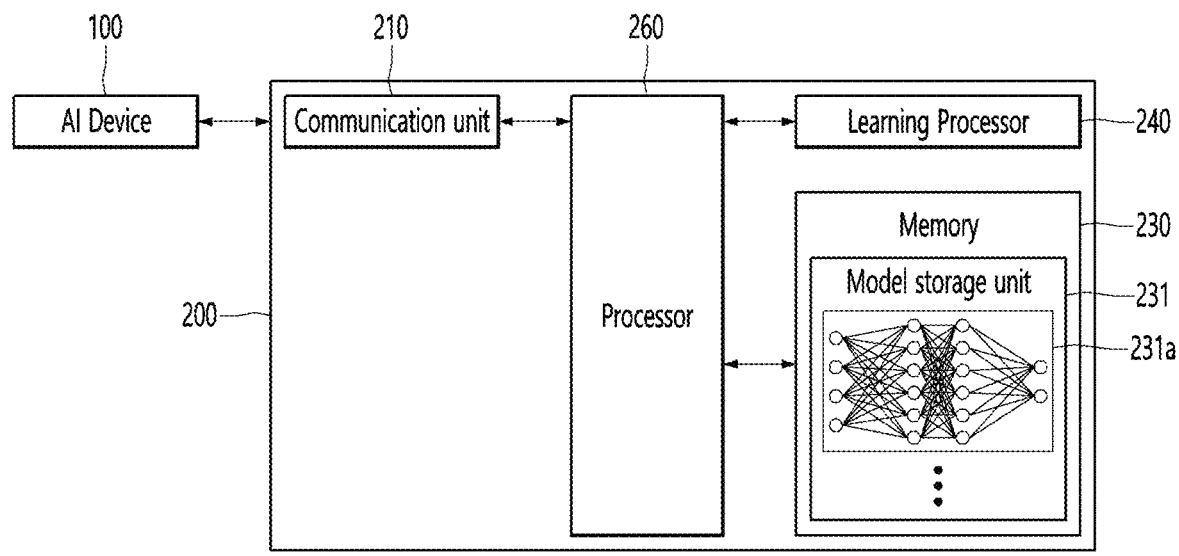
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. In this case, the AI server 200 may be included as a partial configuration of the AI device 100, and may perform at least part of the AI processing together.

The AI server 200 may include a communication interface 210, a memory 230, a learning processor 240, a processor 260, and the like.

The AI server 200 may include a communication interface 210, a memory 230, a learning processor 240, a processor 260, and the like.

The communication interface 210 may transmit and receive data to and from an external device such as the AI device 100.

The memory 230 may include a model storage 231. The model storage 231 may store a learning or learned model (or an artificial neural network 231*a*) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models is implemented in software, one or more instructions that constitute the learning model may be stored in memory 230.

The processor 260 may infer the result value for new input data by using the learning model and may generate a response or a control command based on the inferred result value.

Figure 3:
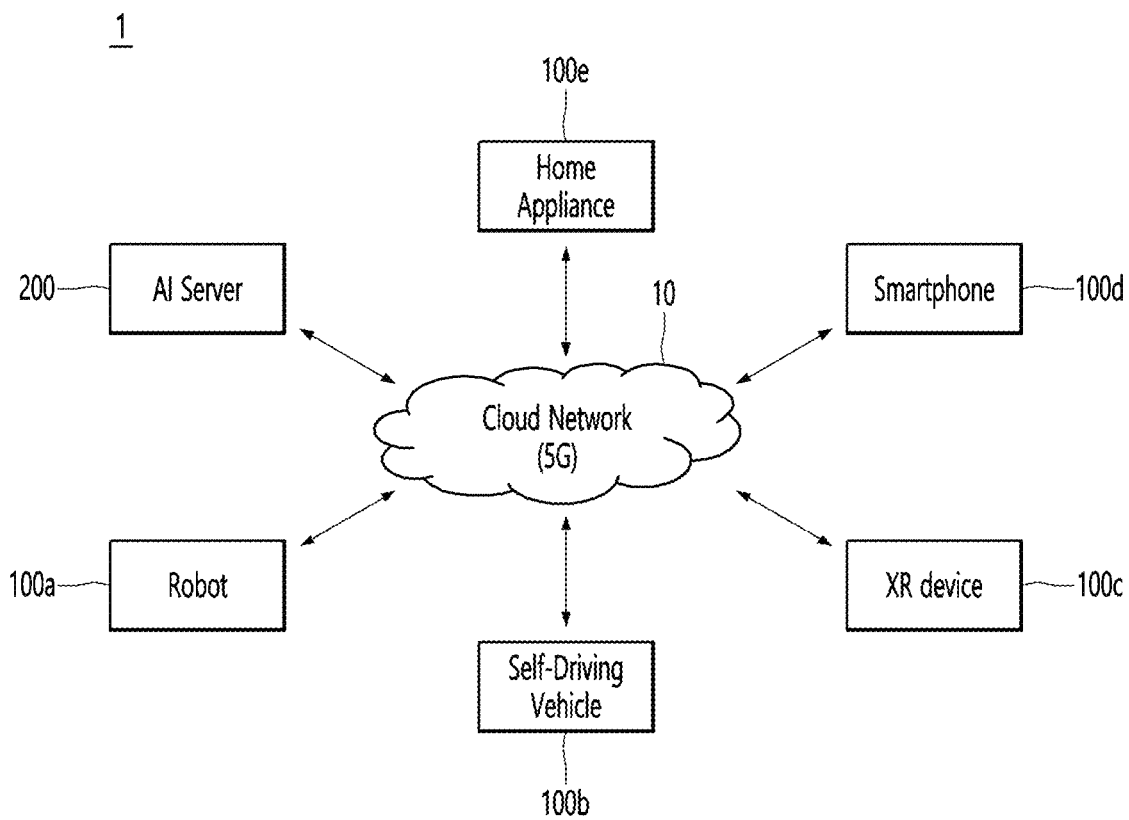
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

In other words, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, In other words, the robot 100a, the self-driving vehicle 100b, the XR device 100c, the smartphone 100d, or the home appliance 100e through the cloud network 10, and may assist at least part of AI processing of the connected AI devices 100a to 100e.

In this case, the AI server 200 may learn the artificial neural network according to the machine learning algorithm instead of the AI devices 100a to 100e, and may directly store the learning model or transmit the learning model to the AI devices 100a to 100e.

In this case, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

Figure 4:
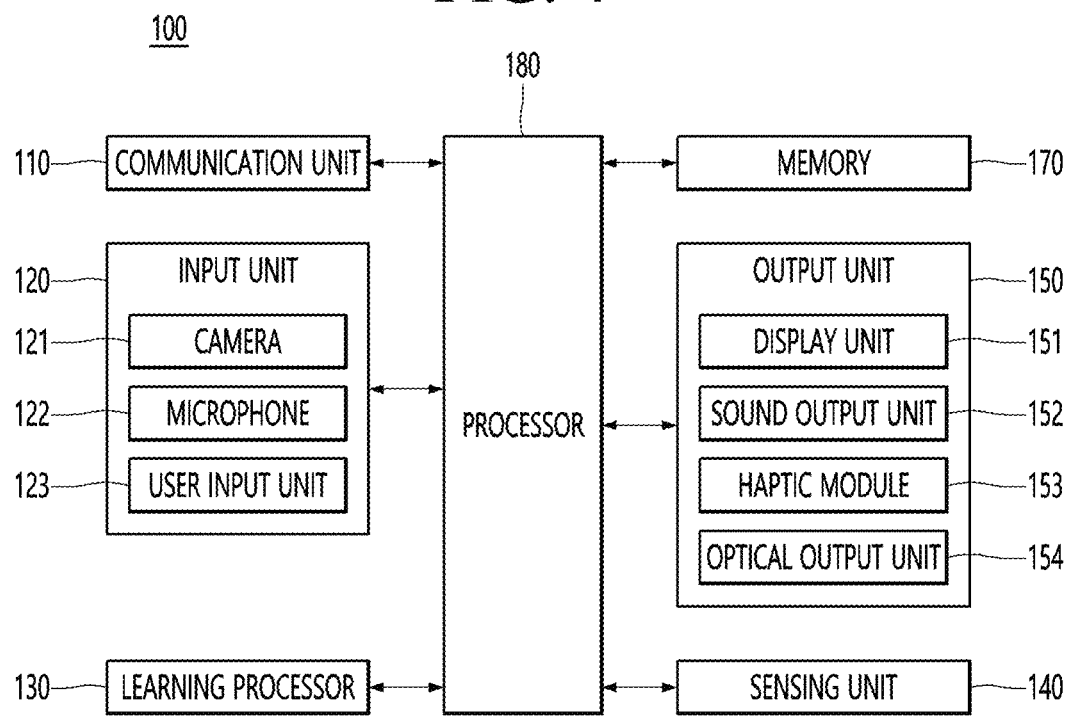
FIG. 4 illustrates an AI device according to another embodiment of the present disclosure.

FIG. 4 illustrates an AI device 100 according to an embodiment of the present disclosure.

The redundant repeat of FIG. 1 will be omitted below.

Referring to FIG. 4, the input device 120 may include a camera 121 for image signal input, a microphone 122 for receiving audio signal input, and a user input device 123 for receiving information from a user.

Voice data or image data collected by the input device 120 are analyzed and processed as a user's control command.

Then, the input device 120 is used for inputting image information (or signal), audio information (or signal), data, or information inputted from a user and the mobile terminal 100 may include at least one camera 121 in order for inputting image information.

The camera 121 processes image frames such as a still image or a video acquired by an image sensor in a video call mode or a capturing mode. The processed image frame may be displayed on the display device 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input device 123 is to receive information from a user and if information is inputted through the user input device 123, the processor 180 may control an operation of the mobile terminal 100 to correspond to the inputted information.

The user input device 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The output device 150 may include at least one of a display device 151, a sound output module 152, a haptic module 153, or an optical output module 154.

The display device 151 may display (output) information processed in the mobile terminal 100. For example, the display device 151 may display execution screen information of an application program running on the mobile terminal 100 or user interface (UI) and graphic user interface (GUI) information according to such execution screen information.

The display device 151 may be formed with a mutual layer structure with a touch sensor or formed integrally, so that a touch screen may be implemented. Such a touch screen may serve as the user input device 123 providing an input interface between the mobile terminal 100 and a user, and an output interface between the mobile terminal 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user may feel. A representative example of a haptic effect that the haptic module 153 generates is vibration.

The optical output module 154 outputs a signal for notifying event occurrence by using light of a light source of the mobile terminal 100. An example of an event occurring in the AI device 100 includes message reception, call signal reception, missed calls, alarm, schedule notification, e-mail reception, and information reception through an application.

The refrigerator described below may be a home appliance having artificial intelligence. That is, the artificial intelligence device 100 may be a refrigerator.

The refrigerator may include all the components of the artificial intelligence device 100 shown in FIG. 4.

The refrigerator may be called an artificial intelligence refrigerator.

Figure 5:
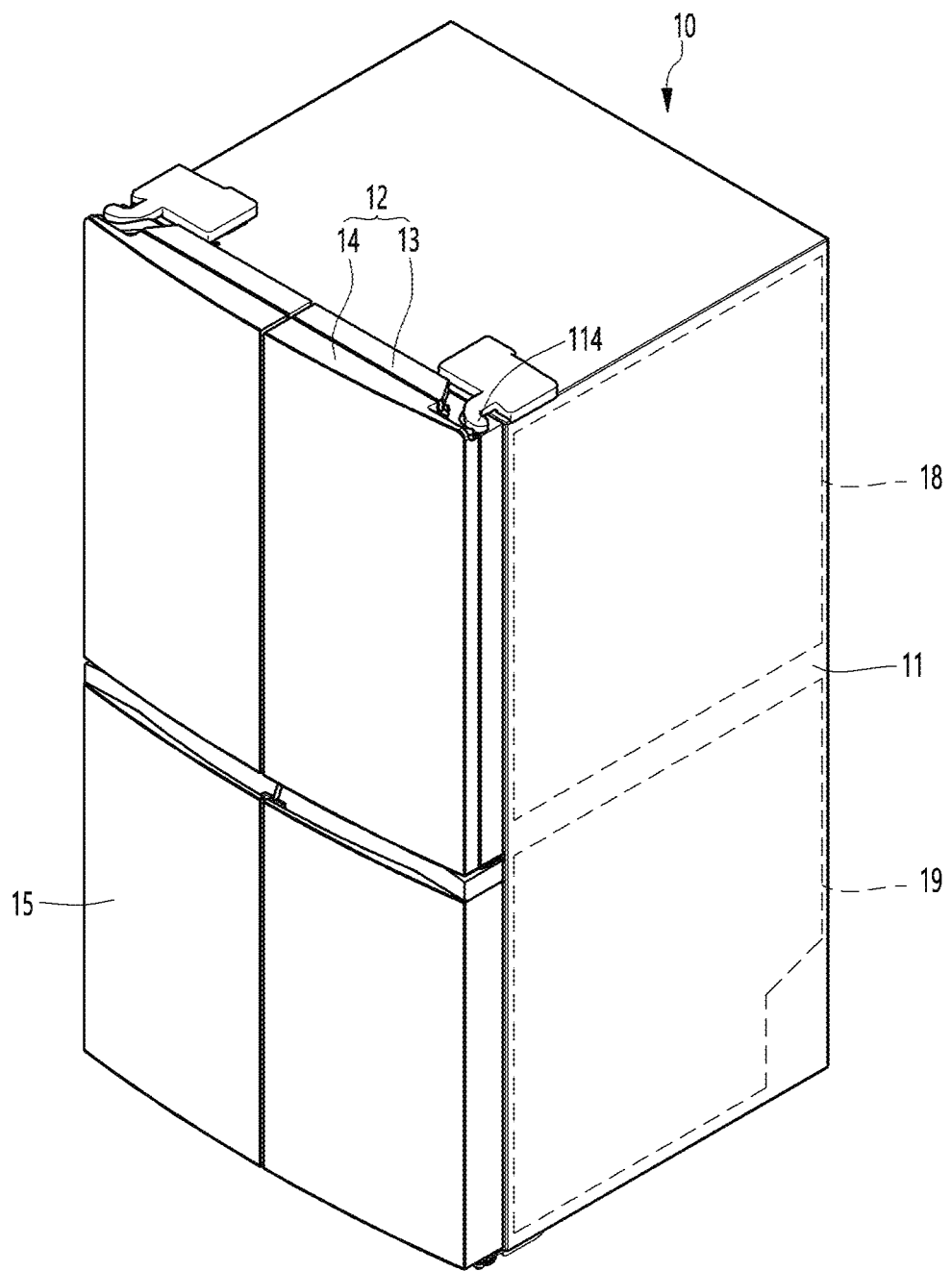
FIG. 5 is a perspective view of a refrigerator according to an embodiment of the present disclosure.
Figure 6:
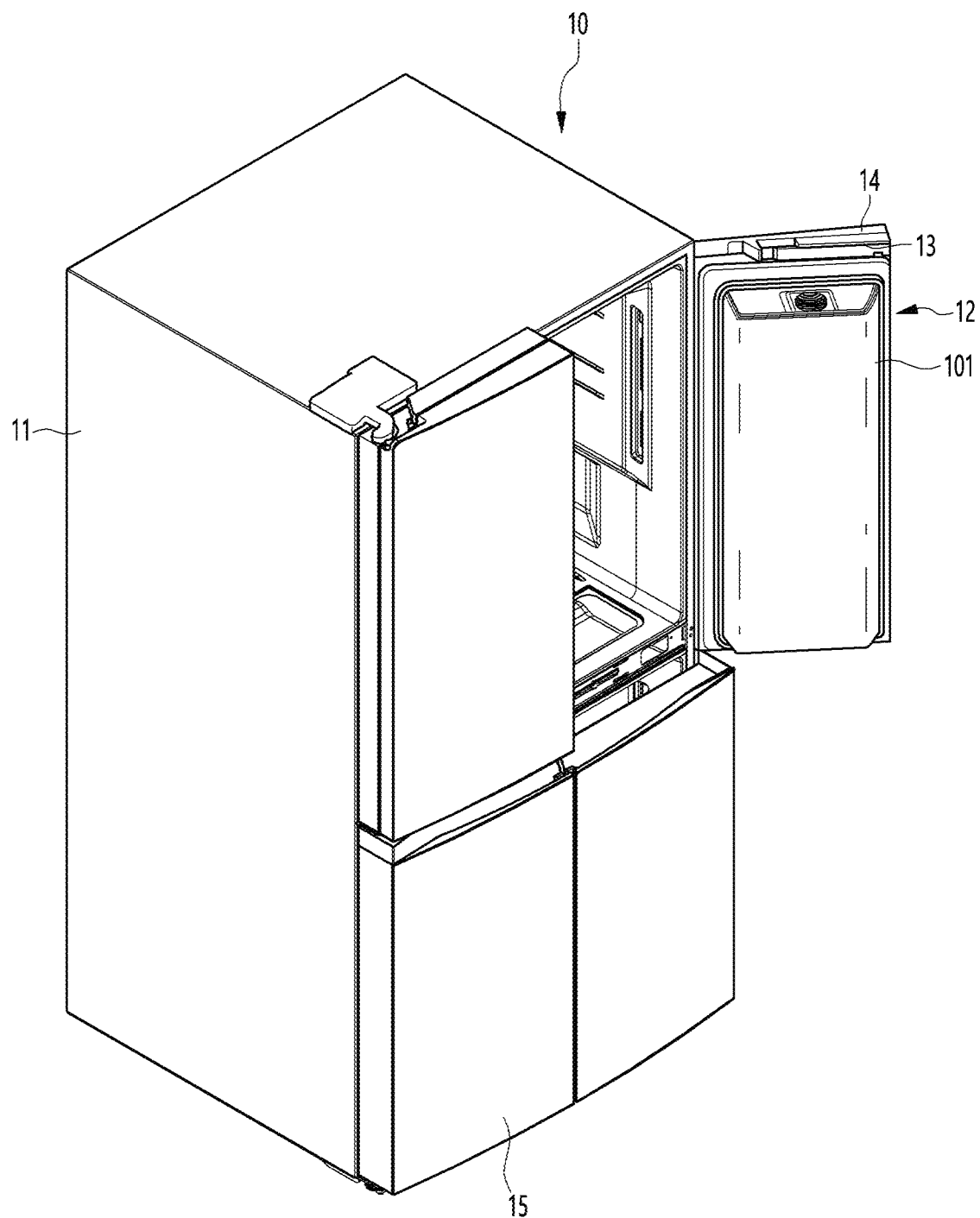
FIG. 6 is a perspective view showing a state in which a refrigerator compartment door of a refrigerator is opened according to an embodiment of the present disclosure.
Figure 7:
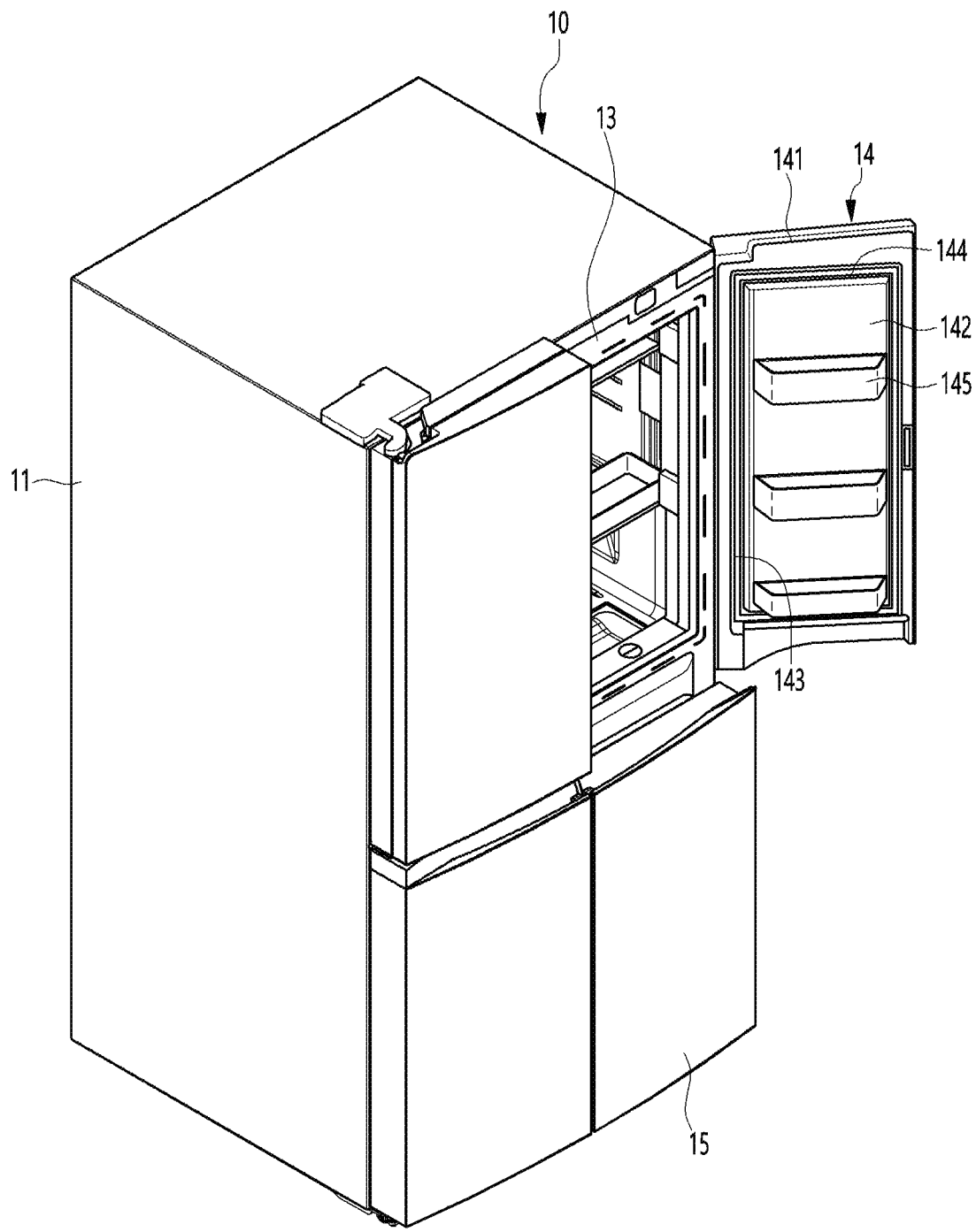
FIG. 7 is a perspective view showing a state in which an outer door of refrigerator compartment doors of a refrigerator is opened according to an embodiment of the present disclosure.

FIG. 5 is a perspective view of a refrigerator according to an embodiment of the present disclosure, FIG. 6 is a perspective view showing a state in which a refrigerator compartment door of a refrigerator is opened according to an embodiment of the present disclosure, and FIG. 7 is a perspective view showing a state in which an outer door of refrigerator compartment doors of a refrigerator is opened according to an embodiment of the present disclosure.

Referring to FIGS. 5 to 7, the refrigerator 10 may include a cabinet 11 having a plurality of storage compartments therein and doors 12 and 15 provided in a front surface of the cabinet 11 to selectively open or close any one of the plurality of storage compartments.

The plurality of storage compartments may include a refrigerator compartment 18 and a freezer compartment 19.

The doors 12 and 15 may include a refrigerator compartment door 12 rotatably provided in the front of a refrigerator compartment 180 and a freezer compartment door 15 rotatably provided in the front of a freezer compartment 19.

Cold air generated by an evaporator may be supplied to the refrigerator compartment 180, and the inside of the refrigerator compartment 180 may be cooled. The evaporator may be provided behind a rear wall of the refrigerator compartment.

The refrigerator compartment door 12 may be provided as a pair, and may be rotatably connected to the front left and right edges of the cabinet 11.

The refrigerator compartment door 12 may include an inner door 13 which is in close contact with the front of the cabinet 11 and an outer door 14 which is rotatably connected to the inner door 13 at the front of the inner door 13.

The outer door 14 and the inner door 13 may be referred to as a first door and a second door respectively.

In a state in which the inner door 13 is closed, edges of the rear surface are in close contact with the front surface of the cabinet 11, and in a state in which the outer door 14 is closed, the edges of the rear surface are in close contact with the front surface of the inner door 13. The housing 101 may be mounted on the rear surface of the inner door 13.

A first hinge 114 may be provided on the upper side of the cabinet 11 such that the refrigerator compartment door 12 may be rotatable with respect to the cabinet 11.

One side of the first hinge 114 may be connected to the upper surface of the cabinet 11, and the other side thereof may be connected to the inner door 13. The inner door 13 and the outer door 13 may be rotatable together about the first hinge 114.

The inner door 13 may include a second hinge (not shown) that enables the outer door 14 to be rotatable with respect to the inner door 13. The outer door 14 may be rotated around the second hinge alone, and a front portion of the inner door 13 may be opened by the rotation of the outer door 14.

The outer door 14 may include an outer case 141, a door liner 142 mounted on a rear surface of the outer case 141, and a door dike 143 protruding to a predetermined height from the outer liner 142 and disposed to be surrounded along outer edges of the door liner 142.

An outer basket 145 capable of storing food may be mounted on the rear surface of the outer door 14. The outer basket 145 may be detachably coupled to the door dike 143. A plurality of outer basket 145 may be provided and may be spaced apart from one another by a predetermined distance in the vertical direction.

The door liner 142 may be provided with a sealing member 144. The sealing member 144 may be disposed along edges of the rear portion of the outer case 141 to prevent the leakage of cold air in a space between the inner door 13 and the outer door 14.

The door dike 143 may fix the outer basket 145.

Figure 8:
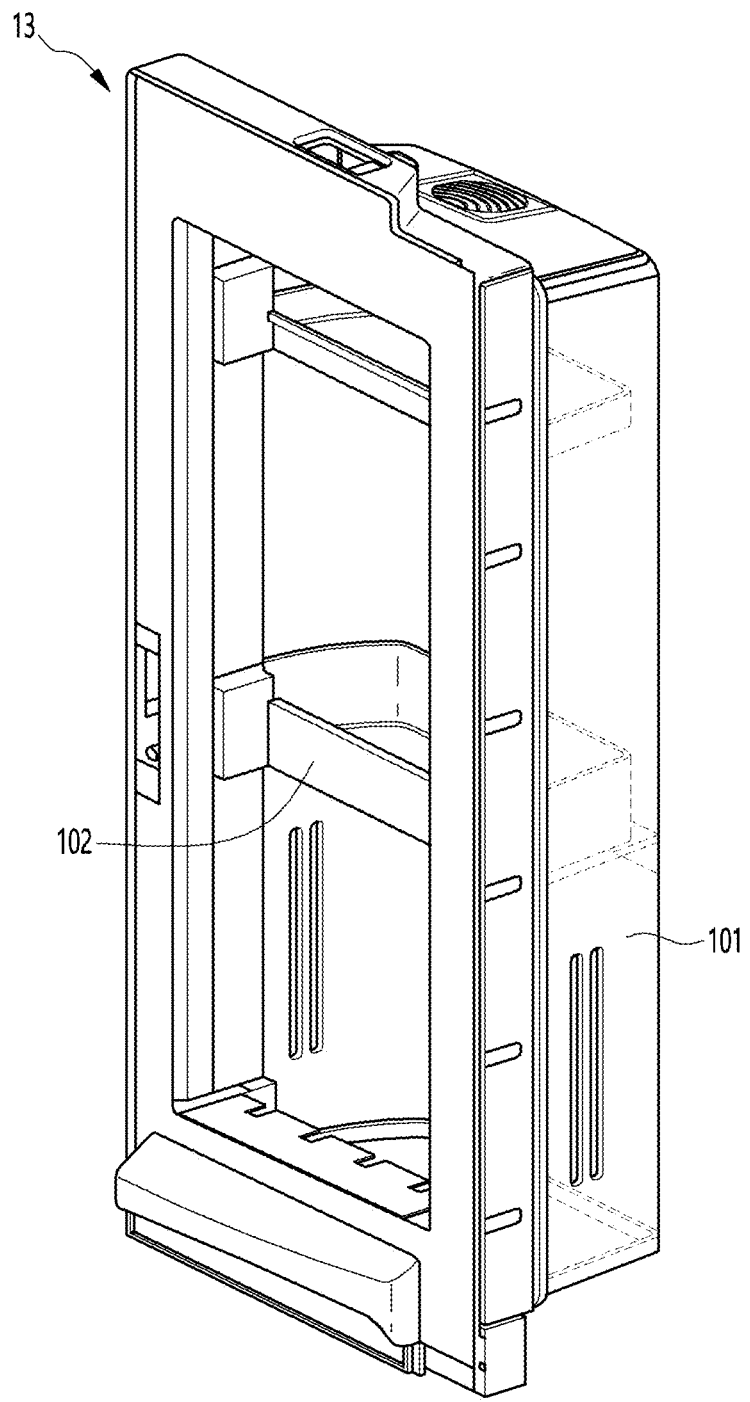
FIG. 8 is a perspective view showing a configuration of an inner door of a refrigerator compartment door of a refrigerator according to an embodiment of the present disclosure.

FIG. 8 is a perspective view showing a configuration of an inner door of a refrigerator compartment door of a refrigerator according to an embodiment of the present disclosure.

The housing 101 may be coupled to the rear of the inner door 13. The basket 102 may be mounted in a storage space of the housing 101.

A plurality of baskets 102 may be provided and store food.

Figure 9:
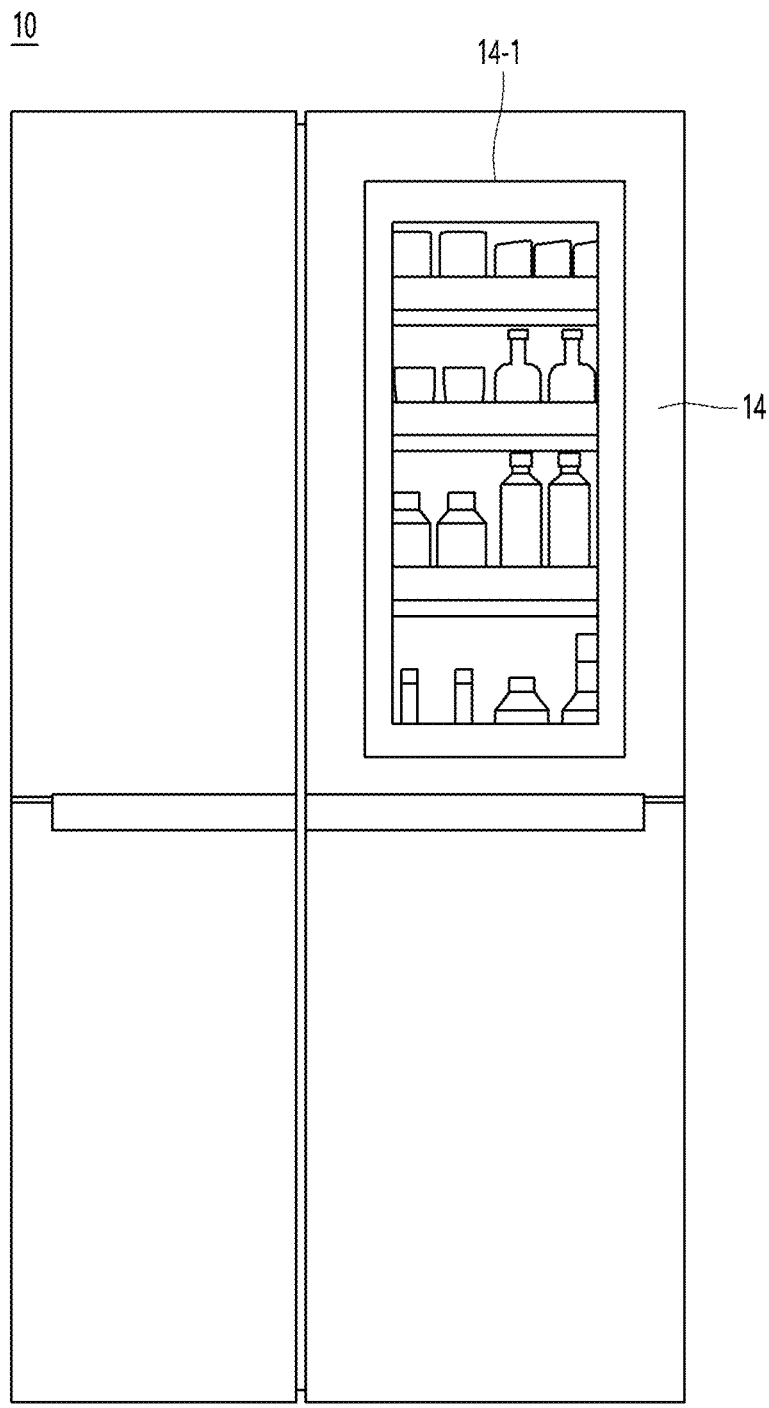
FIG. 9 is a front view of a refrigerator in a state in which a refrigerator compartment door is closed according to an embodiment of the present disclosure.

FIG. 9 is a front view of a refrigerator in a state in which a refrigerator compartment door is closed according to an embodiment of the present disclosure.

That is, FIG. 9 shows a state where both the inner door 13 and the outer door 14 are closed.

A transparent display 14-1 may be provided at the front of the outer door 14 of the refrigerator 10. A user may see food stored in the refrigerator compartment through the transparent display 14-1.

As will be described later, the transparent display 14-1 may display information about food stored in the refrigerator 10.

Figure 10:
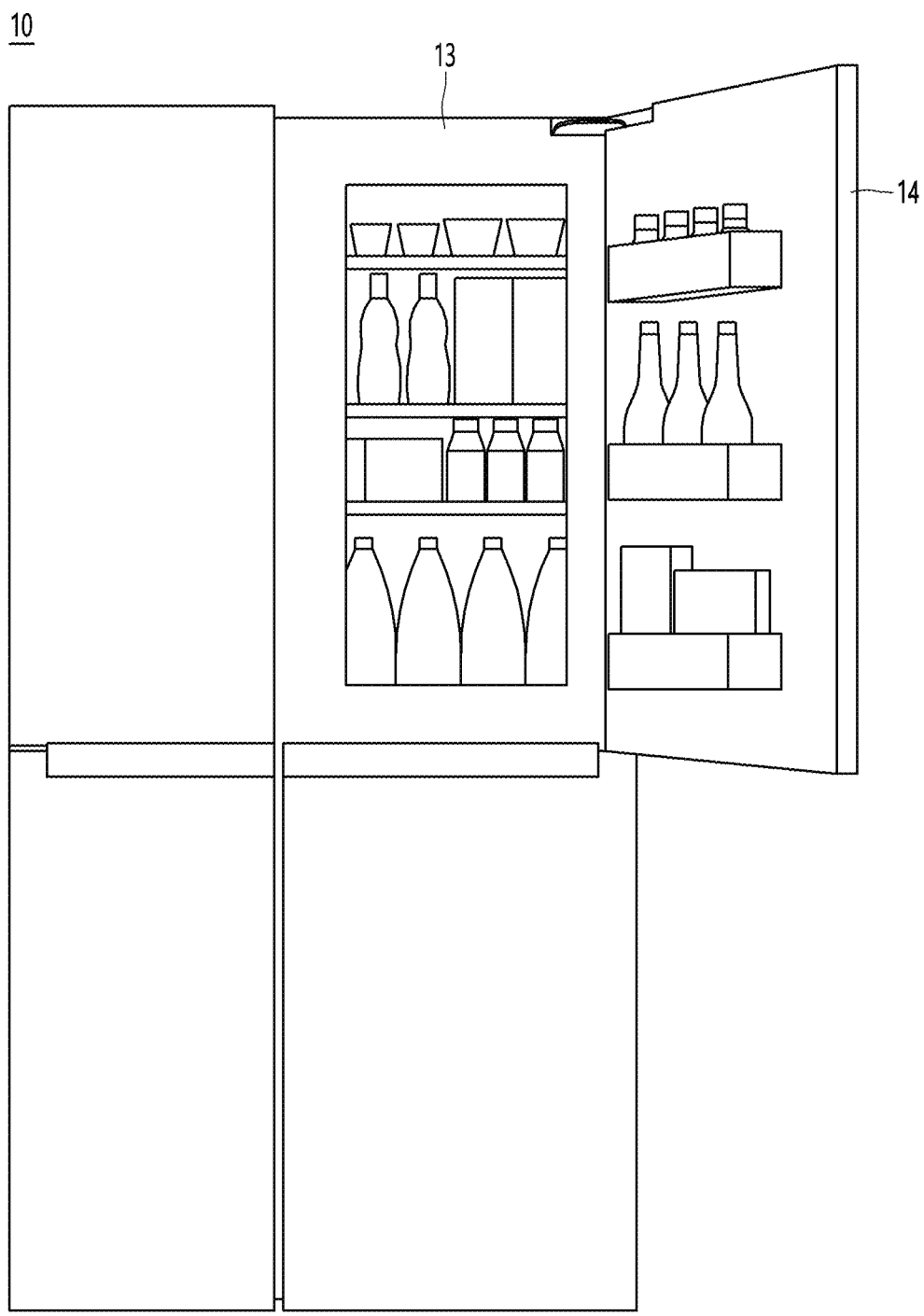
FIG. 10 is a front view of a refrigerator in a state in which an outer door is opened and an inner door is closed according to an embodiment of the present disclosure.

FIG. 10 is a front view of a refrigerator in a state in which an outer door is opened and an inner door is closed according to an embodiment of the present disclosure.

Referring to FIG. 10, only the outer door 14 constituting a refrigerator compartment door is opened, and the inner door 13 is closed.

The outer door 14 may be provided with one or more cameras. The one or more cameras may photograph the inside of the refrigerator compartment when the outer door 14 is closed.

In particular, the one or more cameras may photograph foods stored in the inner door 13.

Figure 11:
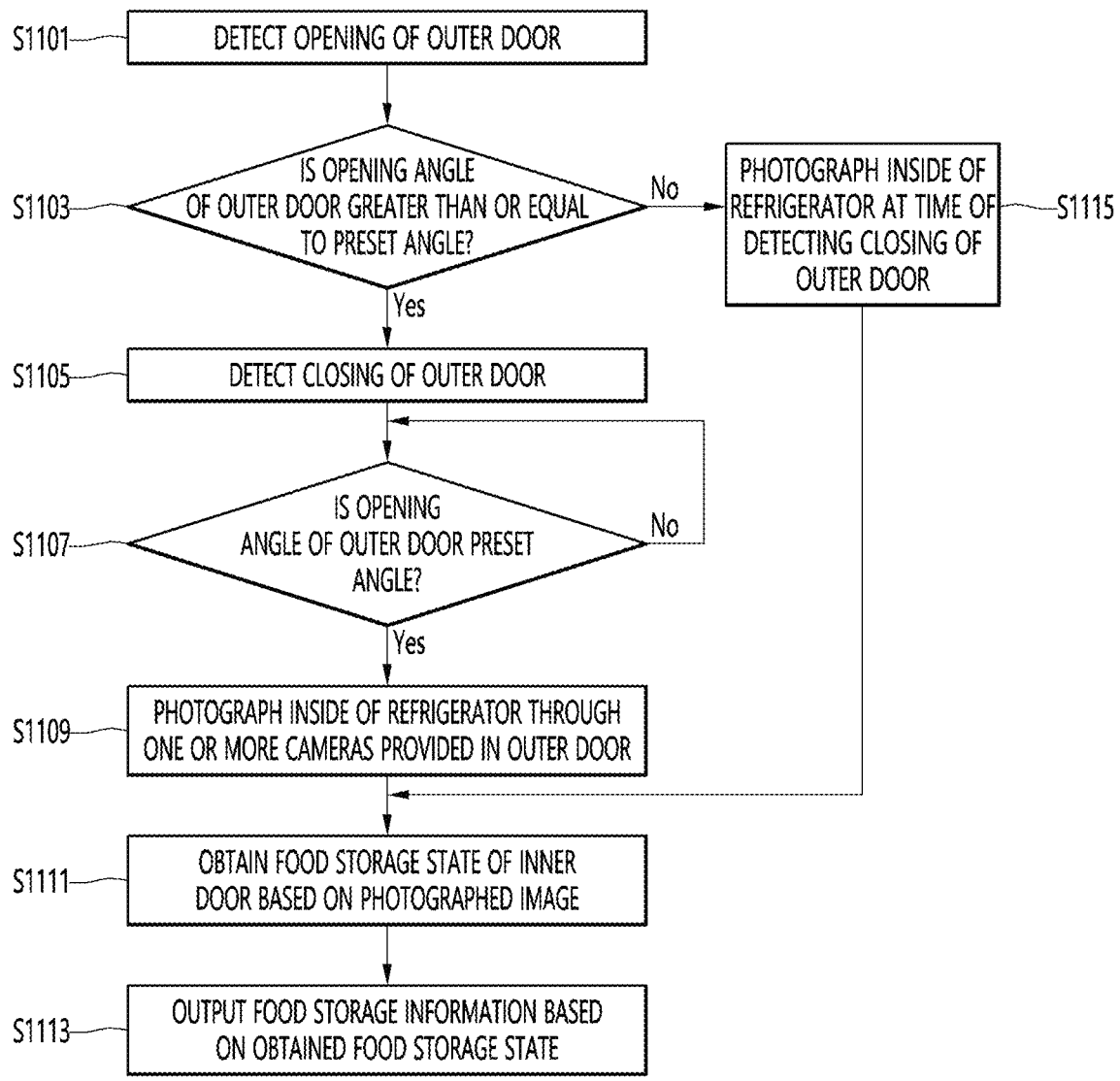
FIG. 11 is a flowchart illustrating a method of operating a refrigerator according to an embodiment of the present disclosure.

FIG. 11 is a flowchart illustrating a method of operating a refrigerator according to an embodiment of the present disclosure.

In FIG. 11, the refrigerator 10 may include all the components of FIG. 4.

FIG. 11 may be a diagram for describing the method of operating the refrigerator 10 for managing food stored in the inner door 13 of the refrigerator 10.

Referring to FIG. 11, a processor 180 of the refrigerator 10 may detect that the outer door 14 is opened (S1101).

The processor 180 may detect whether the outer door 14 is opened or closed by using a sensor provided in the sensing device 140.

For example, the sensing device 140 may include one or more of an optical sensor, a mechanical sensor, an electromagnet sensor, and an acceleration sensor.

The processor 180 may detect the opening/closing operation of the outer door 14 or the opening angle of the outer door 14 based on a sensing signal detected by the sensing device 140.

The sensing device 140 may be included in the hinge 114 or disposed at a position adjacent to the hinge 114.

The optical sensor is a sensor that detects the presence or absence of light, the intensity of light, and the like, and may be a proximity sensor that detects the proximity of an object that is a detection target. The processor 180 may determine whether the outer door 14 is opened or closed or the opening angle by using the presence or absence of light or the intensity of light detected by the optical sensor.

The mechanical sensor may be a sensor that detects a contact from the outside and may be a switch sensor. The processor 180 may detect whether the outer door 14 is opened or closed or the opening angle by using a detection signal indicating whether there is a contact, which is detected by the mechanical sensor.

The electromagnet sensor is a sensor for detecting the magnitude and direction of an electromagnetic field and may be a Hall sensor using the Hall effect. The processor 180 may detect whether the outer door 14 is opened or closed or the opening angle by using a change in the magnitude of the electromagnetic field or a change in the direction of the electromagnetic field which is detected by the electromagnetic sensor.

The acceleration sensor may be a sensor that measures the magnitude of an acceleration along each of the x-axis, the y-axis, and the z-axis. The processor 180 may determine whether the outer door 14 is opened or closed or measure an opening angle by using the magnitudes of the accelerations measured along the three axes.

The processor 180 of the refrigerator 10 may determine whether an opening angle of the outer door 14 is greater than or equal to a preset angle (S1103).

The processor 180 may measure the opening angle of the outer door 14 using any one of the optical sensor, the mechanical sensor, the electromagnet sensor, and the acceleration sensor.

The opening angle of the outer door 14 may represent an opening angle with respect to a state in which the outer door 14 is completely closed.

The preset angle may be an angle set to optimally obtain an image of foods stored in the inner door 13.

The preset angle may be 60 degrees, but is only an example. That is, an angular range may be set instead of a specific angle.

The processor 180 of the refrigerator 10 may determine that the opening angle of the outer door 14 is greater than or equal to the preset angle, and then detect the closing of the outer door 14 (S1105).

The processor 180 of the refrigerator 10 may determine whether the opening angle of the outer door 14 reaches the preset angle (S1107).

The processor 180 may determine whether the opening angle of the outer door 14 is equal to the preset angle while the outer door 14 is being closed.

When the opening angle reaches the preset angle while the outer door 14 is being closed, the processor 180 of the refrigerator 10 may photograph (or capture) the inside of the refrigerator through one or more cameras provided in the outer door 14 (S1109).

When the opening angle of the outer door 14 is equal to the preset angle, the processor 180 may transmit a capture command to the one or more cameras provided in the outer door 14.

The one or more cameras may photograph the inside of the refrigerator 10 according to the capture command.

In particular, the one or more cameras may photograph foods stored in the inner door 13.

The one or more cameras may be provided on a side of the outer door 14. The one or more cameras may be provided around an edge of the outer door 14.

Hereinafter, a process of photographing the inside of the refrigerator through the one or more cameras and the arrangement of the one or more cameras when the outer door 14 is opened and then closed.

Figure 12:
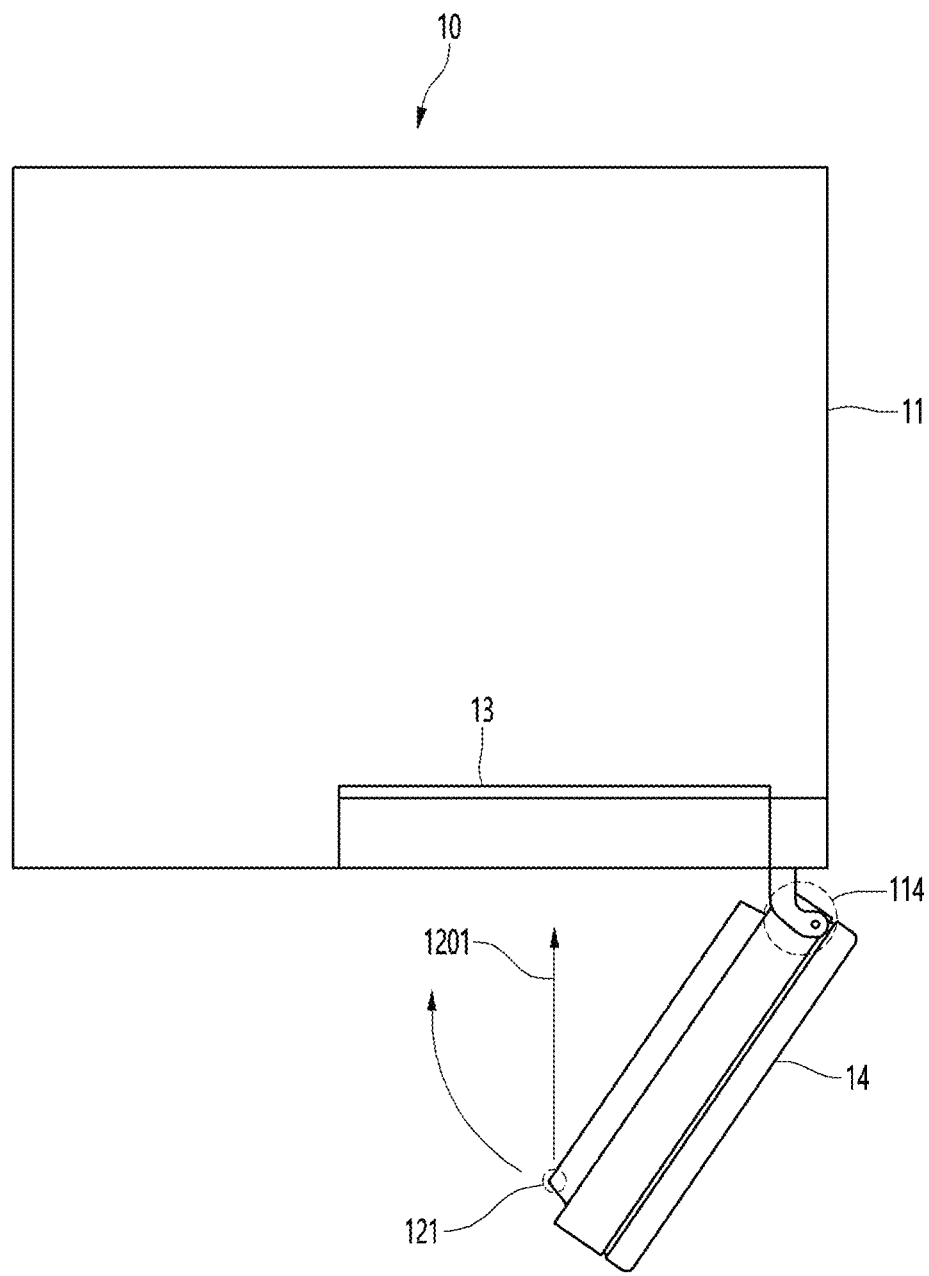
FIG. 12 is a diagram for describing an example of photographing the inner door when the outer door is at the preset angle according to an embodiment of the present disclosure.

FIG. 12 is a diagram for describing an example of photographing the inner door when the outer door is at the preset angle according to an embodiment of the present disclosure.

The refrigerator 10 may detect that the outer door 14 is closed after the outer door 14 is opened at a predetermined angle or more.

The refrigerator 10 may transmit a capture command to the camera 121 when the opening angle of the outer door 14 reaches a preset angle while the outer door 14 is being closed. When the camera 121 receives the capture command, the camera 121 may photograph a front area.

When the outer door 14 is opened at a preset angle, the photographing direction 1201 of the camera 121 may be a front surface of the inner door 13.

That is, when the outer door 14 reaches the preset angle, the camera 121 may photograph the front surface of the inner door 13.

The user may open the outer door 14 and store a food in the inner door 13 or withdraw the food from the inner door 13.

Conventionally, since a camera is provided only in the ceiling wall of the refrigerator 10, it may be difficult to figure out information on the food stored in the inner door 13 properly.

According to an embodiment of the present disclosure, when the user opens and then closes the outer door 14, an image of the inner door 13 may be photographed at an optimal photographing angle. The photographed image may be used to manage a food storage state of the inner door 13.

Figure 13:
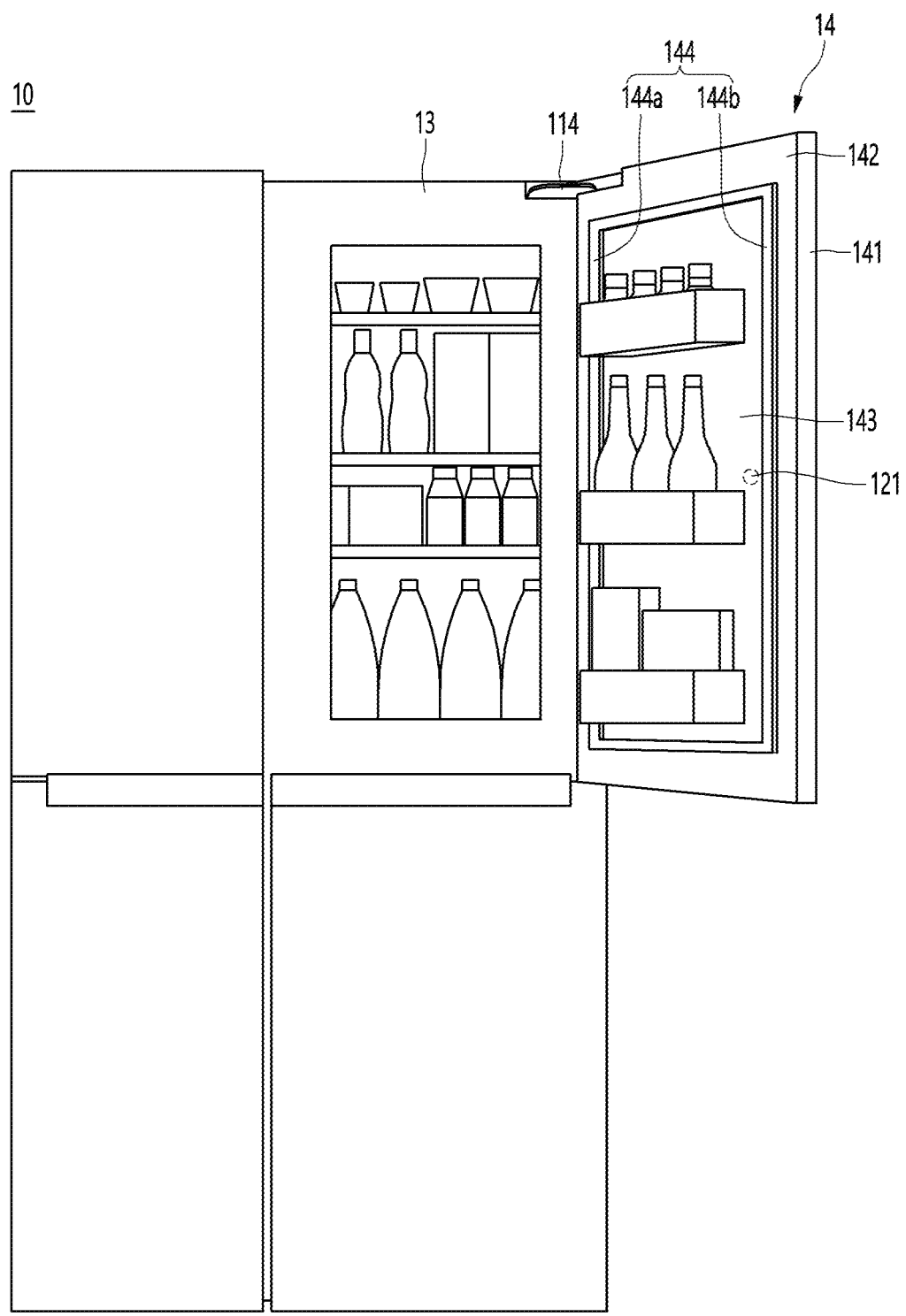
FIGS. 13 to 14 are diagrams for describing an arrangement of cameras provided in an outer door according to various embodiments of the present disclosure.
Figure 14:
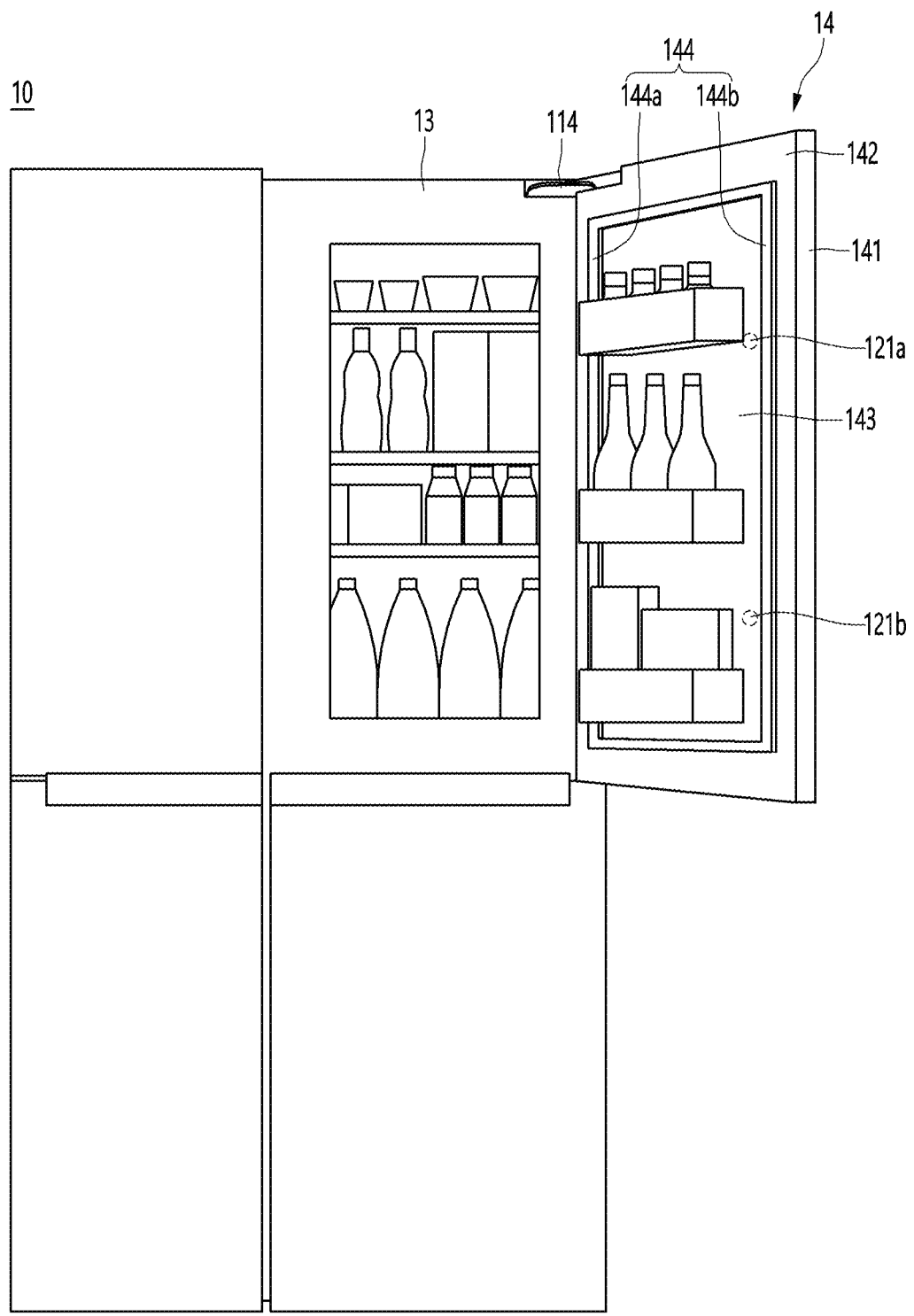

FIGS. 13 to 14 are diagrams for describing an arrangement of a camera provided in an outer door according to various embodiments of the present disclosure.

FIG. 13 illustrates an embodiment when one camera is provided in the outer door, and FIG. 14 is an embodiment when two cameras are provided in the outer door.

Referring to 13 and 14, the outer door 14 may include an outer case 141, a door liner 142, a sealing member 144, and a door dike 143.

The door case 141 may be a metal plate forming the front surface of the outer door 14.

The door liner 142 may be formed of a material such as plastic inside the door case 141.

The sealing member 144 may be formed of an elastic material such as rubber.

The sealing member 144 may seal an internal cold air of the refrigerator compartment from leaking to the outside when the outer door 14 is closed.

The sealing member 144 may be disposed on the rear surface of the door liner 142.

The sealing member 144 may include an inner sealing member 144a and an outer sealing member 144b. The inner sealing member 144a may be disposed adjacent to a first hinge 114, and the outer sealing member 144b may be disposed farther than the first hinge 114, compared to the inner sealing member 144a.

A pair of connection gaskets connecting the inner sealing member 144a and the outer sealing member 144b may be further provided between the inner sealing member 144a and the outer sealing member 144b.

The door dike 143 may fix a basket provided in the outer door 14.

FIG. 13 shows an example in which one camera 121 is disposed in the door dike 143 of the outer door 14.

Referring to FIG. 13, the camera 121 may be located at the door dike 143 adjacent to the outer sealing member 144b.

The door dike 143 may include a receiving groove for accommodating the camera 121, and the camera 121 may be provided in the receiving groove.

Referring to FIG. 14, an example in which two cameras are disposed in the door dike 143 of the outer door 14 is illustrated.

The door dike 143 may be provided with a first camera 121a and a second camera 121b.

The first camera 121a and the second camera 121b may be disposed at a predetermined distance. The distance between the first camera 121a and the second camera 121b may be 338 mm, but this is only an example.

A first image photographed by the first camera 121a may be used to analyze a storage state of food stored in an upper shelf of the inner door 13, and a second image photographed by the second camera 121b may be used to analyze a storage state of food stored in a lower shelf of the inner door 13.

Each of the camera 121 shown in FIG. 13 and the cameras 121a and 121b shown in FIG. 14 may have a high frame rate that is robust to blur. For example, the frame rate of each camera may be 60 fps.

Each camera may be a wide angle camera, and the angle of view of the camera may be 135 degrees.

Hereinafter, the arrangement structure of the camera provided in the outer door and the outer door will be described in detail.

Figure 15A:
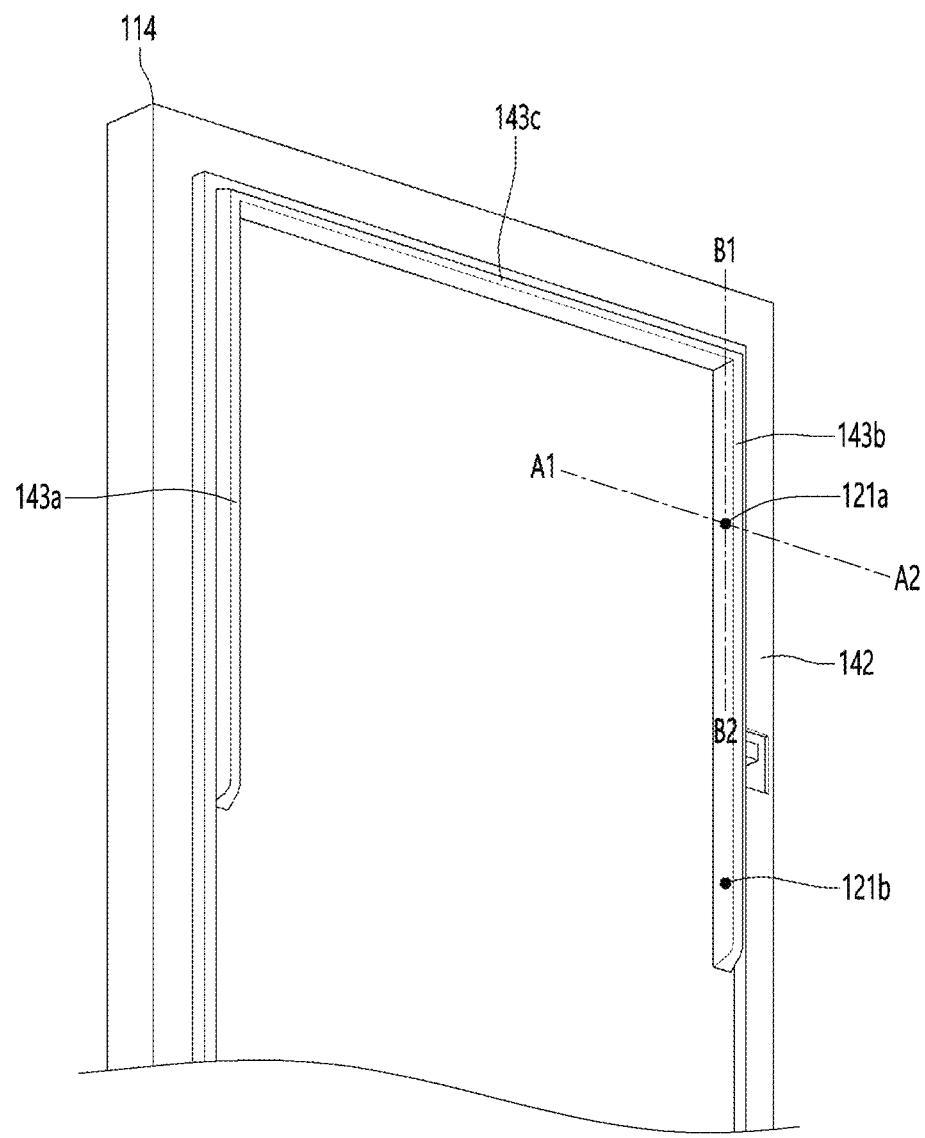
FIGS. 15A and 15B are diagram for describing arrangement positions of a camera attached to a door dike of an outer door according to one embodiment of the present disclosure.
Figure 15B:
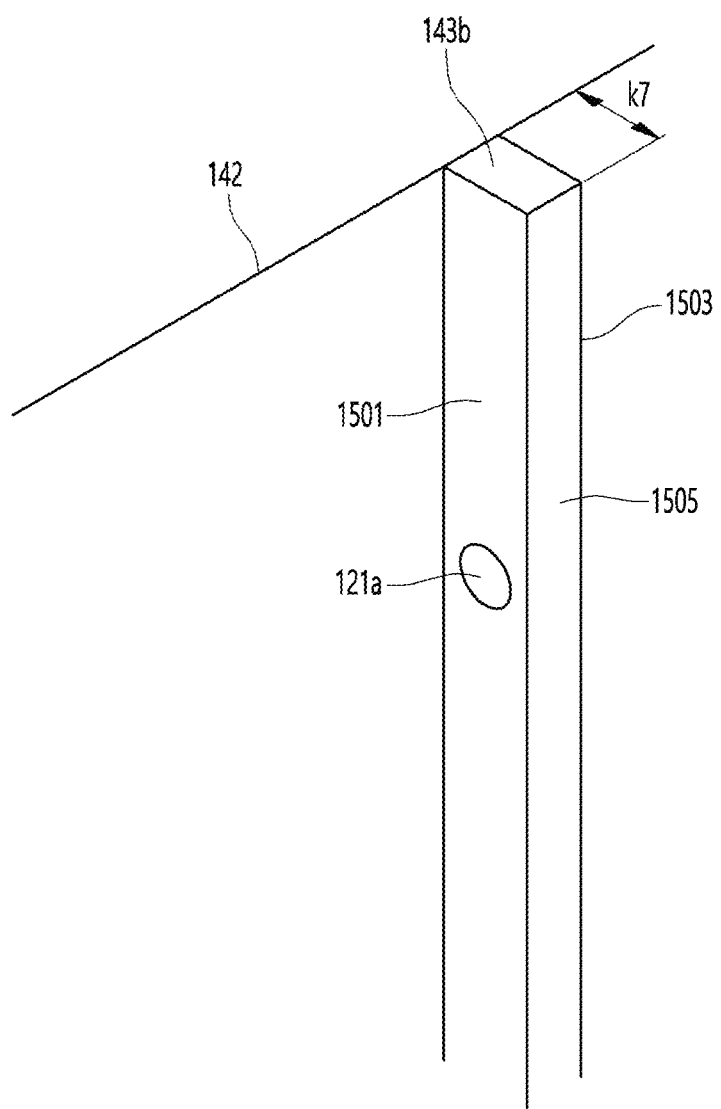

FIGS. 15A and 15B are diagram for describing arrangement positions of a camera attached to a door dike of an outer door according to one embodiment of the present disclosure.

In particular, FIG. 15A illustrates an example in which the door dike 143 is provided with two cameras 121a and 121b.

Referring to FIG. 15A, the outer door 14 may include a door liner 142 and a door dike 143 protruding to a predetermined height from the door liner 142 and disposed to be surrounded along outer edges of the door liner 142.

The door dike 143 may include a first part 143a, a second part 143b, and a third part 143c. The door dike 143 may be a frame having a rectangular shape.

The first part 143a and the second part 143b may face each other. The length of the first part 143a and the length of the second part 143b may be longer than the length of the third part 143c.

The third part 143c may connect the first part 143a and the second part 143b to each other.

A fourth part (not shown) may connect the first part 143a and the second part 143b to each other.

The first part 143a may be closer to the first hinge 114 than the second part 143b.

The first camera 121a and the second camera 121b may be embedded in the second part 143b of the door dike 143. In order for the first camera 121a and the second camera 121b to be embedded in the second part 143b of the door dike 143, the second part 143b may be provided with a built-in groove.

Referring to FIG. 15B, an arrangement position of the first camera 121a is illustrated. The second part 143b of the door dike 143 may include a first surface 1501, a second surface 1503, and a third surface 1505. The second part 143b may protrude by a predetermined height k7 based on the door liner 142.

The first surface 1501 and the second surface 1503 may be disposed to face each other. The third surface 1505 may connect the first surface 1501 and the second surface 1503.

The first surface 1501 may face the right side of the outer door 14 and the second surface 1503 may face the left side of the outer door 14.

The first camera 121a may be provided on the first surface 1501 of the second part 143b.

In a state where the outer door 14 is completely closed, the first surface 1051 may face the front surface of the inner door 13.

The second camera (not shown) may be provided below the first camera 121a. The second camera may also be provided on the first surface 1501 of the second part 143b.

Even when one camera is provided, the camera may be provided on the first surface 1501 of the second part 143b.

The arrangement of the camera will be described in more detail.

Figure 16A:
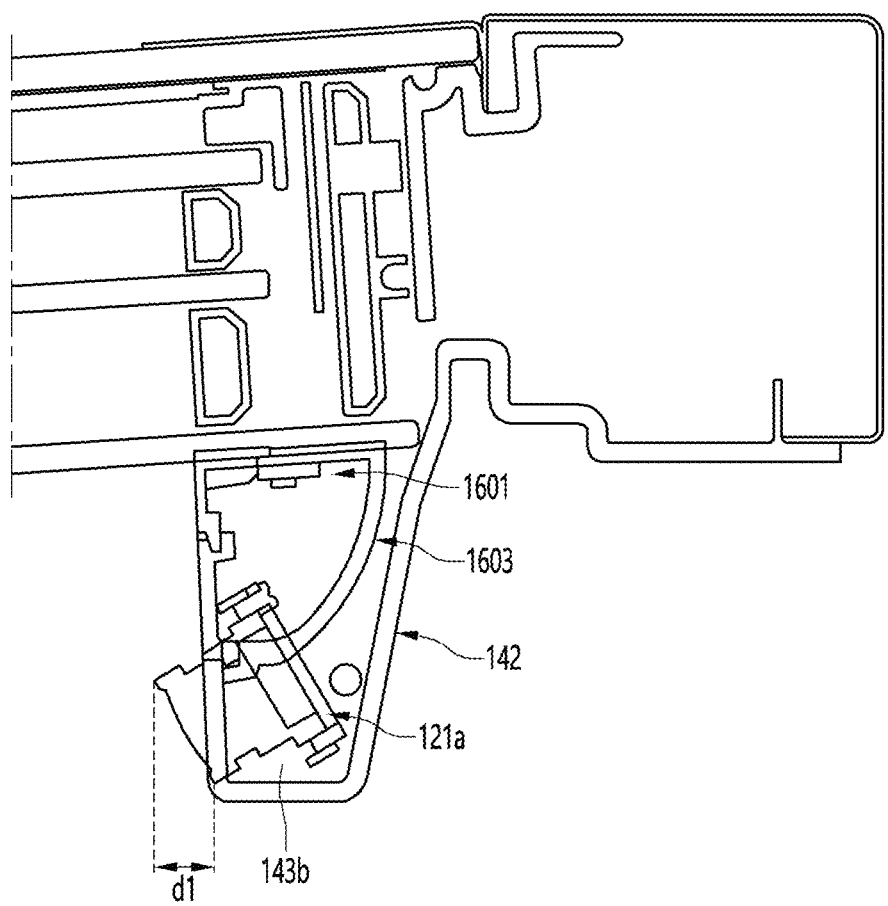
FIG. 16A is a transverse cross-sectional view of the outer door 14 taken in the direction A1-A2 in FIG. 15A.
Figure 16B:
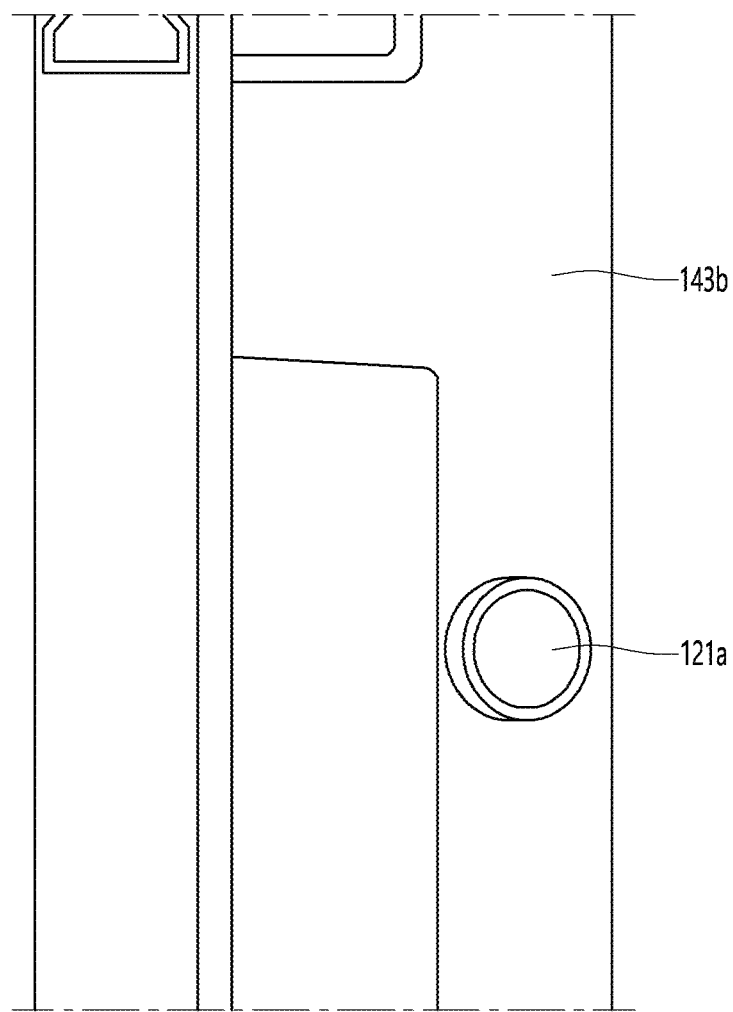
FIG. 16B is a longitudinal cross-sectional view of the outer door 14 taken in the direction B1-B2 in FIG. 15A.

FIG. 16A is a transverse cross-sectional view of the outer door 14 taken in the direction A1-A2 in FIG. 15A, and FIG. 16B is a longitudinal cross-sectional view of the outer door 14 taken in the direction B1-B2 in FIG. 15A.

Referring to 16A and 16B, a first camera 121a may be provided in the second part 143b of the door dike 143 provided along the outer edges of the door liner 142.

An LED module 1601 that emits light and an LED cover 1603 may be further included in the second part 143b.

A portion of the first camera 121a may protrude by a predetermined distance dl from the second part 143b of the door dike 143.

The photographing angle indicating an angle between the photographing direction of the first camera 121a and the second part 143b of the door dike 143 may be an angle obtained by subtracting a preset opening angle from 90 degrees.

This will be described later.

FIGS. 16A and 16B may also be applied to cross-sectional views taken based on a case in which one camera is provided in the door dike 143 and cross-sectional views taken on the basis of the second camera 121b.

Figure 17:
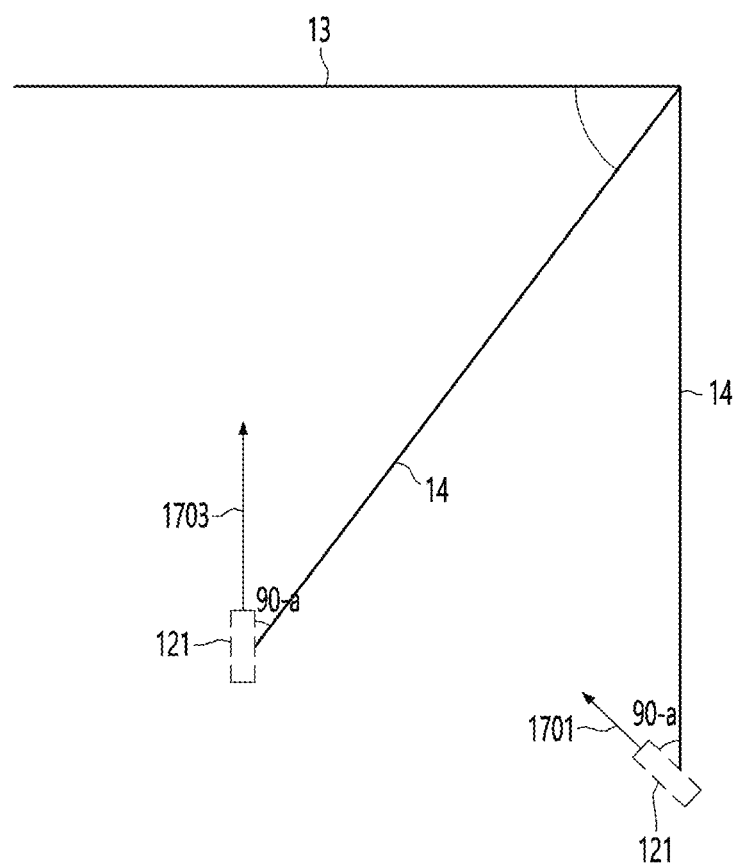
FIG. 17 is a diagram for describing a photographing direction of a camera when an outer door is opened to 90 degrees and the outer door is opened to a preset angle according to an embodiment of the present disclosure.

FIG. 17 is a diagram for describing a photographing direction of a camera when an outer door is opened to 90 degrees and the outer door is opened to a preset angle according to an embodiment of the present disclosure.

Referring to FIG. 17, when the outer door 14 is opened to 90 degrees with respect to the inner door 13 in a closed state, an photographing angle that is an angle between the photographing direction 1701 of the camera 121 and the outer door 14 may be an angle by subtracting a preset opening angle a from 90 degrees.

That is, the camera 121 may be disposed to be tilted by (90−a) degrees with respect to the outer door 14, precisely, the second part 143b of the door dike 143.

The reason for this is to accurately photograph the front surface of the inner door 13 when the opening angle of the outer door 14 reaches the preset opening angle "a".

That is, when the outer door 14 is opened to the preset opening angle "a", the photographing direction 1703 of the camera 121 may face the front surface of the inner door 13. Accordingly, foods in the inner door 13 may be accurately photographed without blurring.

When the preset opening angle is 60 degrees, the tilting angle of the camera 121 may be 30 degrees.

Although the description is given on the assumption that one camera is provided in the door dike 143 with reference to FIG. 17, the embodiment of FIG. 17 may be applied to each camera even when two cameras are provided in the door dike 143.

Again, description is given with reference to FIG. 11.

The processor 180 of the refrigerator 10 may obtain a food storage state of the inner door 13 based on an image photographed by one or more cameras (S1111).

The processor 180 may recognize a plurality of food items included in the photographed image by using an image recognition model.

The processor 180 may obtain the food storage state based on information about the recognized plurality of food items. The food storage state may include information about the types, positions, and number of the plurality of food items provided in the inner door 13.

The image recognition model may be an artificial neural network-based model trained through a deep learning algorithm or a machine learning algorithm.

The image recognition model may include an object detection model and an object identification model.

The object detection model may be a model for detecting one or more objects from image data, and the object identification model may be a model for identifying what are one or more objects detected.

The object detection model may be an artificial neural network-based model trained by a deep learning algorithm or a machine learning algorithm.

The object detection model may be a model that is trained by the learning processor 130 of the artificial intelligence device 100 and stored in the memory 170.

As another example, the object detection model may be a model trained by the learning processor 240 of the AI server 200 and transmitted from the AI server 200 to the artificial intelligence device 100.

An example of detecting a plurality of objects from an image using the object detection model will be described with reference to the accompanying drawings.

The object may be a food.

Figure 18:
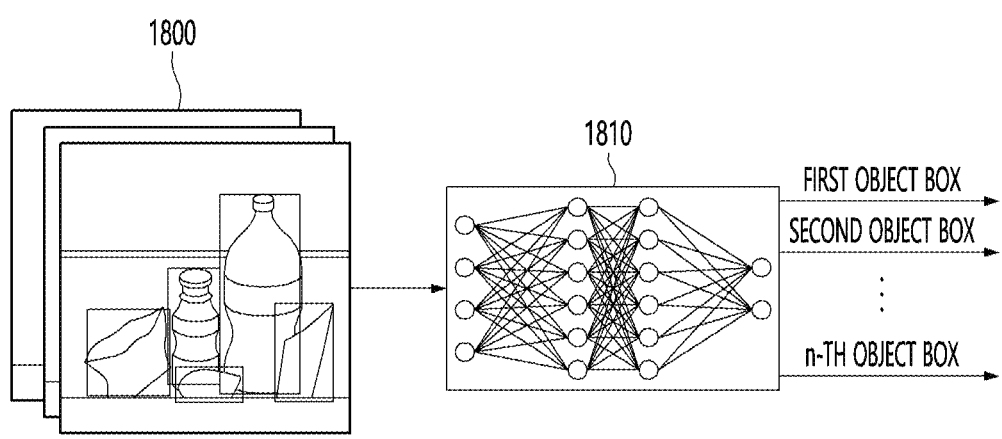
FIGS. 18 and 19 are diagrams for describing a learning process of an object detection model according to an embodiment of the present disclosure.
Figure 19:
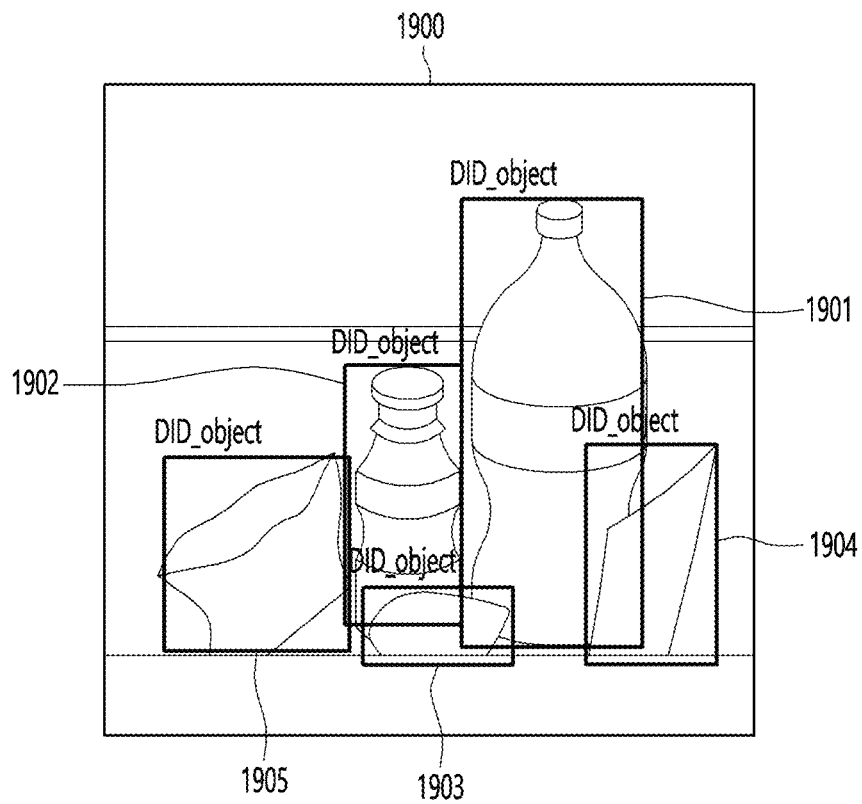

FIGS. 18 and 19 are diagrams for describing a learning process of an object detection model according to an embodiment of the present disclosure.

Referring to FIG. 18, an object detection model 1810 may obtain an object bounding box set containing a plurality of objects from pieces of training image data using a training image data set 1800 including a plurality of pieces of image data.

The object bounding box set may be a set of bounding boxes containing an object.

The object detection model 1800 may detect a plurality of objects from the image data by using a YOLO (You Only Look Once) algorithm.

The YOLO algorithm may consist of a plurality of CNNs.

The YOLO algorithm will be described later.

The YOLO algorithm may include a grid division process, a prediction process, a reliability calculation process, and an object determination process.

The grid division process may be a process of dividing the image data 1900 into a plurality of grids. The size of each of the plurality of grids may be the same.

The prediction process may be a process of predicting the number of bounding boxes specified in a predefined shape with respect to the center of a grid for each grid.

The bounding box specified in a predefined shape may be generated from data by the K-average algorithm, and may contain dictionary information about the size and shape of an object.

Each bounding box may be designed to detect objects of different sizes and shapes.

Each bounding box may represent the shape or boundary of an object.

The reliability calculation process may be a process of calculating the reliability of the bounding box according to whether an object is included in each of the obtained bounding boxes or whether only a background is present alone.

The object determination process may be a process of determining that an object exists in a bounding box having reliability equal to or greater than a preset value according to the reliability calculation process.

Through the object determination process, the plurality of bounding boxes 1901 to 1905 included in the image data 1900 may be extracted.

A description will be given with reference to FIG. 5 again. The processor 180 may obtain identification information of each object from the plurality of bounding boxes extracted through the object detection model 1800.

The processor 180 may identify an object existing in the bounding box from the image data corresponding to each bounding box using the object identification model.

The object identification model may be an artificial neural network-based model trained using a deep learning algorithm or a machine learning algorithm.

The object identification model may be a model trained through supervised learning.

The object identification model may be a model for inferring identification information of an object from image data. The identification information of the object may be information for identifying an object, such as a name of the object, an identifier of the object, and the like.

The object identification model may be a model for outputting identification information of an object using a training data set including training image data and labeling data labeled on the training image data as input data.

Figure 20:
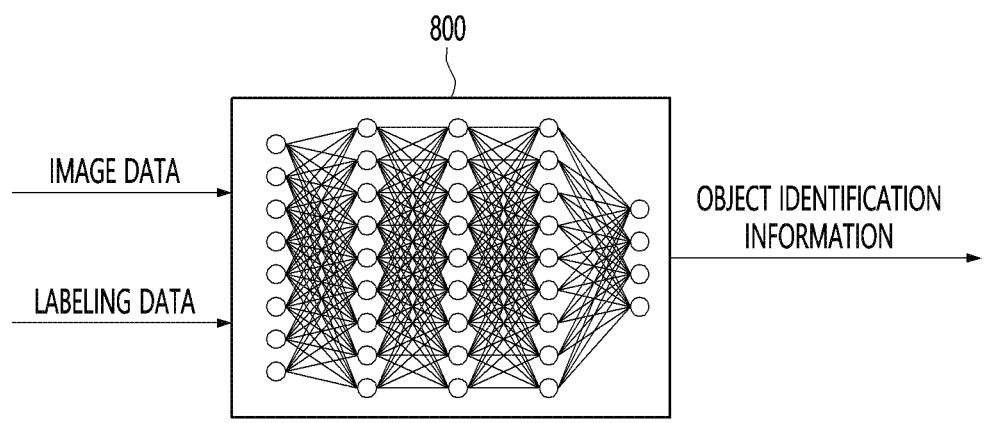
FIG. 20 illustrates a learning process of an object identification model according to an embodiment of the present disclosure.

FIG. 20 illustrates a learning process of an object identification model according to an embodiment of the present disclosure.

Referring to FIG. 20, an object identification model 2000 may infer object identification information using a training data set including training image data and labeling data labeled thereon.

The labeling data is correct answer data and may be object identification information.

The object identification model 2000 may be trained to minimize a cost function corresponding to the difference between the labeling data and the object identification information.

The cost function of the object identification model 2000 may be expressed as the squared mean of the difference between a label for object identification information corresponding to each image data and object identification information inferred from each image data.

When an input feature vector is extracted from the training image data and inputted, an object identification result is output as a target feature vector, and the object identification model 2000 may be trained to minimize a loss function corresponding to the difference between the target feature vector which is output and the labeled object identification information.

The object identification model 2000 may be trained by the learning processor 130 of the refrigerator 10 or the learning processor 240 of the AI server 200 and installed on the refrigerator 10.

The object identification model 2000 may determine first object identification information from first image data corresponding to a first bounding box 1901 shown in FIG. 19. For example, the first object identification information may be a beverage (or cola).

The object identification model 2000 may determine second object identification information from second image data corresponding to a second bounding box 1902. For example, the second object identification information may be milk.

As described above, it is possible to identify which food the object is, from the image data through the object identification model 2000.

Again, description is given with reference to FIG. 11.

The processor 180 may obtain a food storage state by using the obtained object identification information. The food storage state may include one or more of the kinds, the positions, and the number of the plurality of food items stored in the inner door 13.

The position of the food item may be obtained through the position of the object bounding box detected through the object detection model 1800.

The processor 180 of the refrigerator 10 may output food management information based on the obtained food storage state of the inner door 13 (S1113).

The food management information may include one or more of stock change information of food, purchase linkage information according to the stock of food, and recipe information.

The stock change information may be information indicating that the stock of food stored in the inner door 13 is changed.

The purchase linkage information may represent site information for purchasing a particular food according to the stock state of the food.

The recipe information may be information representing a recipe of a dish that may be cooked using a food stored in the inner door 13.

The processor 180 may output food management information through the transparent display 14-1 provided in the outer door 14.

The processor 180 may display the food management information on the transparent display 14-1 when the outer door 14 is completely closed.

Figure 21:
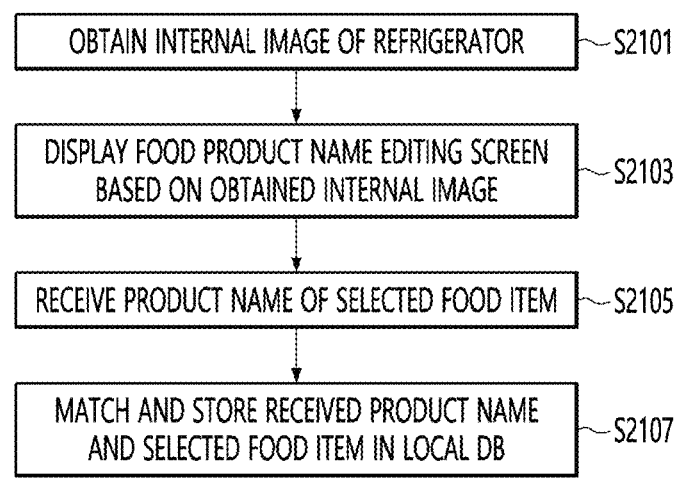
FIG. 21 is a flowchart for describing a method of operating a refrigerator according to another embodiment of the present disclosure.

FIG. 21 is a flowchart illustrating a method of operating a refrigerator according to another embodiment of the present disclosure.

In particular, FIG. 21 is a diagram for describing a process of editing a product name of a food product and storing the product name by a user.

The processor 180 of the refrigerator 10 may obtain an internal image of the refrigerator 10 through the camera 121 (S2101).

As shown in FIG. 13, the camera 121 provided in the outer door 14 may photograph the internal image of the refrigerator 10.

The embodiment of FIG. 11 may be used as an embodiment in which the processor 180 photographs the internal image of the refrigerator 10.

For arrangement of one or more cameras, the previously-described embodiments may be used.

The processor 180 of the refrigerator 10 may display a food product name editing screen including a plurality of food image items respectively corresponding to a plurality of foods included in the internal image through the transparent display 14-1 provided on the front of the outer door 14, based on the obtained internal image (S2103).

When the outer door 14 is completely closed, the processor 180 may display the food product name editing screen on the transparent display 14-1.

The processor 180 may identify a plurality of foods included in the internal image using the obtained internal image.

According to the embodiment of FIGS. 18 to 20, the processor 180 may obtain pieces of object identification information respectively corresponding to the plurality of foods included in the internal image, from the internal image.

The object identification information may be the name of a food.

The food product name editing screen may include a plurality of food image items respectively corresponding to the plurality of foods. Each of the plurality of food image items may represent an image representing a recognized food.

The food product name editing screen will be described with reference to FIG. 22.

Figure 22:
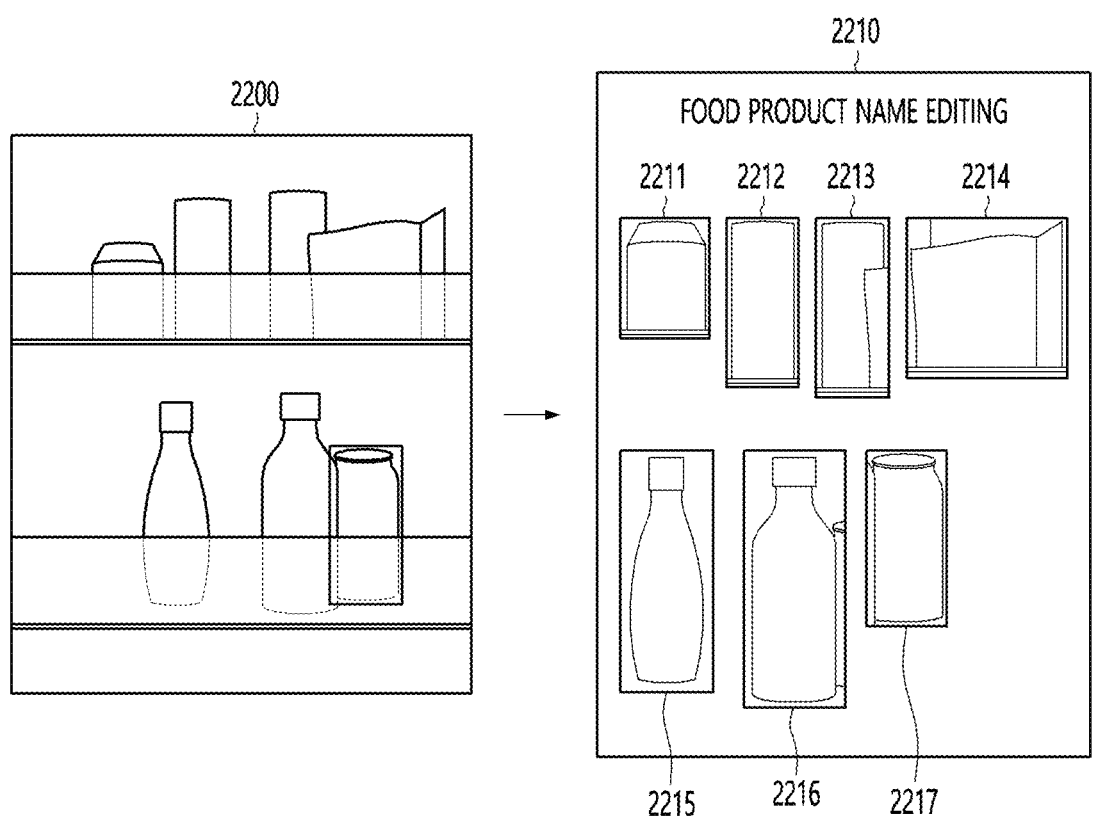
FIG. 22 is a diagram for describing a food product name editing screen according to an embodiment of the present disclosure.

FIG. 22 is a diagram for describing a food product name editing screen according to an embodiment of the present disclosure.

Referring to FIG. 22, when the outer door 14 is completely closed, the refrigerator 10 may display a food product name editing screen 2210 on the transparent display 14-1 provided in the outer door 14.

The food product name editing screen 2210 may include a plurality of food image items 2211 to 2217 respectively corresponding to the plurality of foods recognized from the photographed internal image 2210.

Each of the plurality of food image items 2211 to 2217 may be an image cropped from the internal image 2210.

As another example, the food product name editing screen 2210 may be displayed on a user's terminal capable of communicating with the refrigerator 10. The terminal may be either a smartphone or a TV.

Again, description will be given with reference to FIG. 21.

The processor 180 may receive an input for receiving a product name of a food image item selected from among a plurality of food image items (S2105).

The processor 180 may receive an input for selecting any one of a plurality of food image items 2211 to 2217 included in the food product name editing screen 2210.

As the food image item is selected, the processor 180 may display an editing window for editing the product name of the food image item.

The processor 180 may receive the product name of the food image item through the editing window.

Details will be described with reference to FIG. 23.

Figure 23:
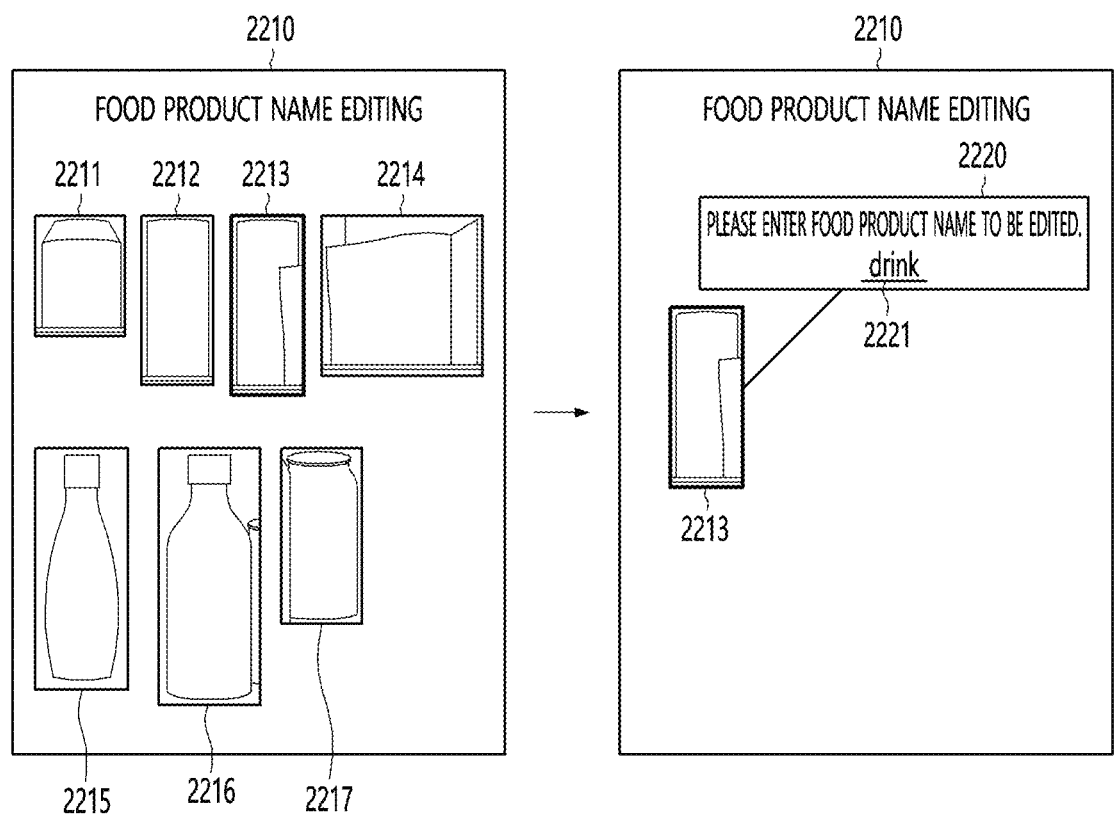
FIG. 23 is a diagram for describing a process for editing a product name of a food image item according to an embodiment of the present disclosure.

FIG. 23 is a diagram for describing a process for editing a product name of a food image item according to an embodiment of the present disclosure.

Referring to FIG. 23, when one item 2213 of the plurality of food image items 2211 to 2217 included in the food product name editing screen 2210 is selected, the processor 180 may display an editing window 2221 for editing the product name of the selected food image item 2213 on the food product name editing screen 2210.

The editing window 2221 may include text for requesting input of a product name of the selected food image item 2213.

The processor 180 may receive a product name <drink> through the editing window 2221.

That is, the user may change the food image item 2213 to a desired item through the editing window 2221. When the product name of the food image item 2213 is <soda>, the product name of the food image item 2213 may be changed from <soda> to <drink> according to the user's editing.

Again, description will be given with reference to FIG. 21.

The processor 180 may match and store the received product name in a local DB of the refrigerator 10 and the food image item selected according to the received input (S2107).

In an embodiment, the local DB may be a DB included in the memory 170 of the refrigerator 10. The local DB may include information on a food of which the product name has been received through the food product name editing screen 2210.

The local DB may match and store identification information identifying the food the edited product name of the food.

The local DB may be created by each of a plurality of users. That is, the memory 170 may include a plurality of local DBs respectively corresponding to a plurality of users. Here, the DB may be hardware or may refer to a storage area of the memory 170.

Figure 24:
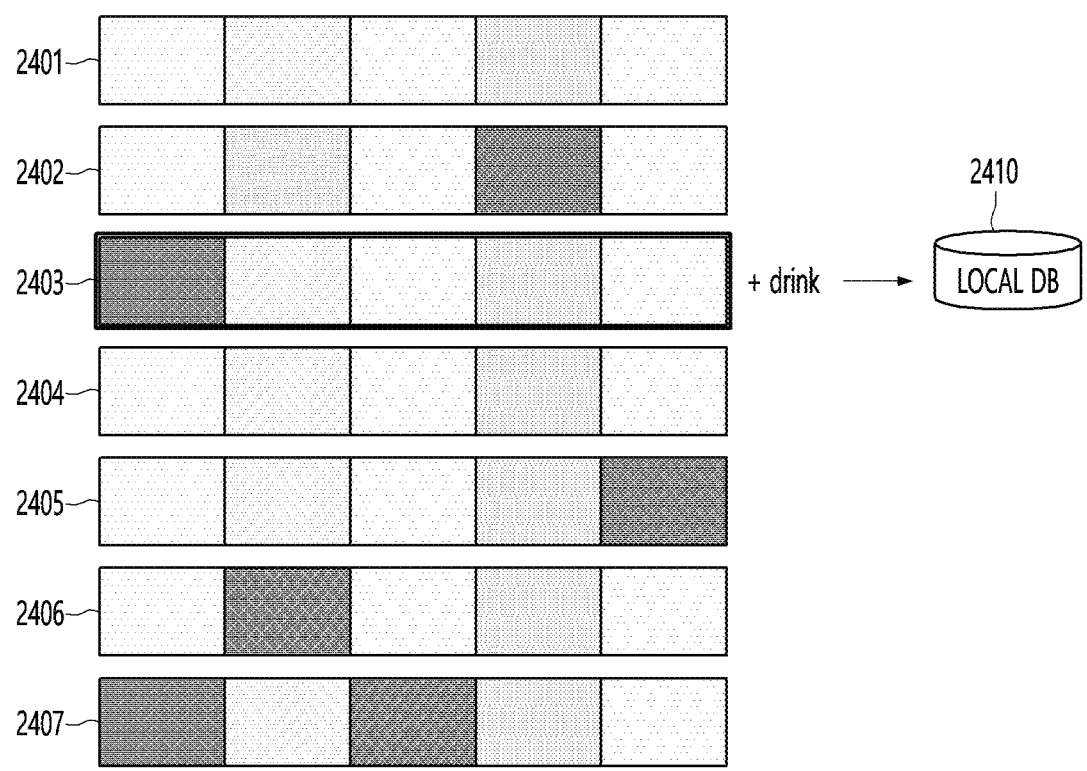
FIG. 24 is a diagram for describing a process of storing the identification information and product name of a food in a local DB when the product name of a food selected by a user is edited according to an embodiment of the present disclosure.

FIG. 24 is a diagram for describing a process of storing the identification information and product name of a food in a local DB when the product name of a food selected by a user is edited according to an embodiment of the present disclosure.

Referring to FIG. 24, a plurality of food features 2401 to 2407 respectively corresponding to a plurality of food image items 2211 to 2217 recognized are shown.

Each of the plurality of food features 2401 to 2407 may represent a feature vector that identifies each of the plurality of food image items.

The processor 180 may obtain a feature vector of each of the plurality of foods in the process of recognizing foods from the internal image 2200.

The processor 180 may obtain features of each food image item using the object identification model 2000 shown in FIG. 19.

The object identification model 2000 may extract a feature vector from image data of each of a plurality of food image items.

The object identification model 2000 may compare a previously stored feature vector with the extracted feature vector, and output object identification information corresponding to the extracted feature vector.

The processor 180 may match and store, in the local DB 2410, the feature vector 2403 corresponding to the food image item 2213 selected from among the plurality of food image items 2211 to 2217 and the input product name 2221.

The local DB 2410 may store a feature vector and a product name input by a user matching the feature vector. That is, the local DB 2410 may store information on a food edited by a user.

When the product name of the food of the corresponding food image item is input, the processor 180 may store the position where the food is placed in correspondence with the input product name.

That is, the local DB 2410 may store the feature vector of the food, the position where the food is placed when editing the product name of the food, and the edited product name of the food in association with each other.

The processor 180 may extract the position where the food item 2213 is placed from the photographed internal image 2200. The position where the food item 2213 is placed may include coordinate information where the food is located.

The local DB 2410 may be included in the memory 170 of the refrigerator 10. However, the local DB 2410 is not limited thereto and may be included in the memory 230 of the AI server 200.

The refrigerator 10 may transmit a feature vector and a product name matching the feature vector to the AI server 200, and the AI server 200 may store information received from the refrigerator.

Figure 25:
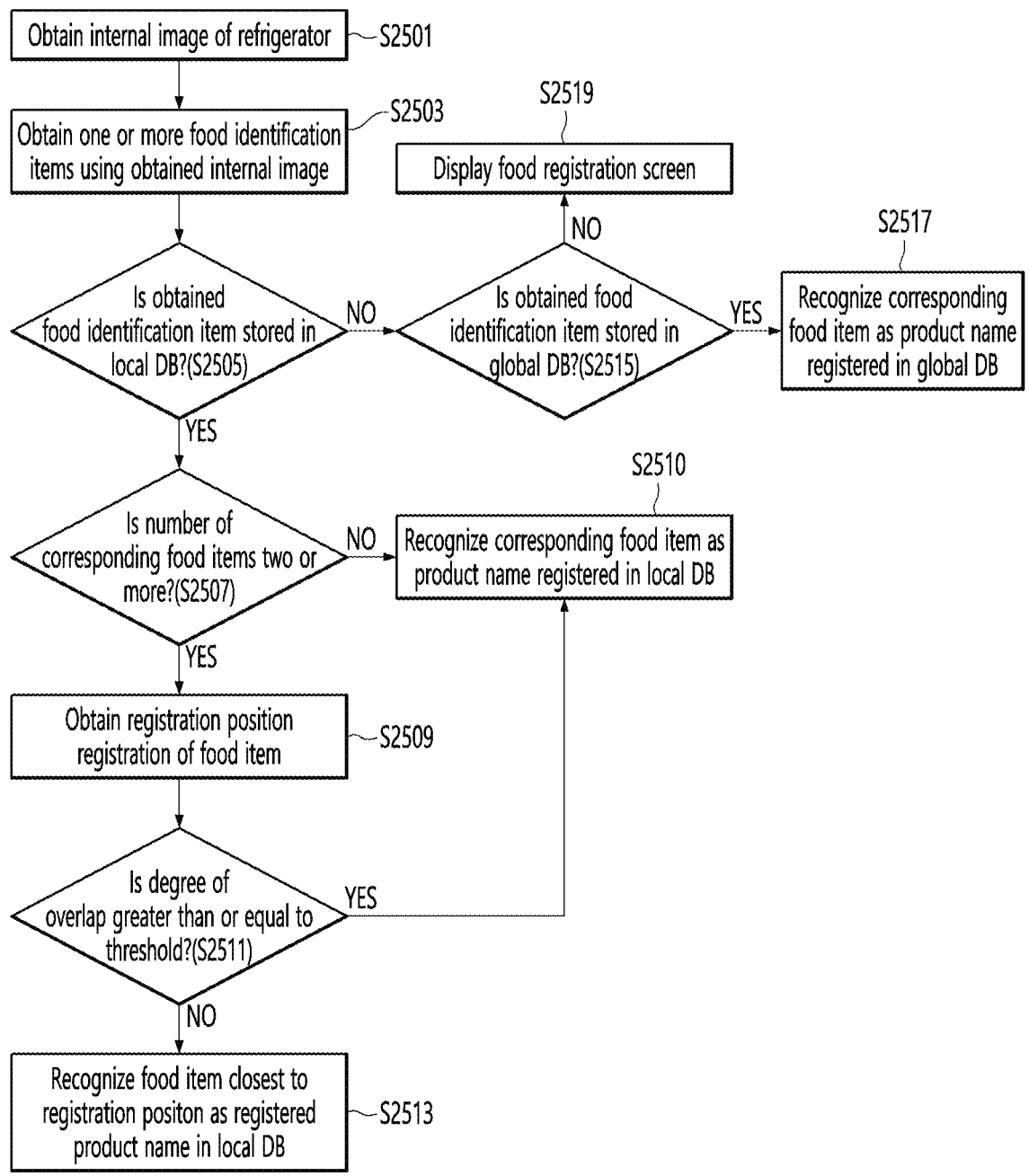
FIG. 25 is a flowchart for describing a method of operating a refrigerator according to another embodiment of the present disclosure.

FIG. 25 is a flowchart for describing a method of operating a refrigerator according to another embodiment of the present disclosure.

In particular, FIG. 25 is an embodiment for describing a process of recognizing a food in the refrigerator 10 by using a product name edited by a user.

Referring to FIG. 25, the processor 180 may obtain an internal image of the refrigerator 10 through the camera 121 (S2501).

As shown in FIG. 13, the camera 121 provided in the outer door 14 may photograph the internal image of the refrigerator 10.

The embodiment of FIG. 11 may be used as an embodiment in which the processor 180 photographs the internal image of the refrigerator 10.

The processor 180 may obtain one or more food identification items by using the obtained internal image (S2503).

In an embodiment, the food identification item may be an item for identifying a food in the refrigerator 10. The food identification item may be a feature vector of the food.

The processor 180 may extract a plurality of feature vectors respectively corresponding to a plurality of foods from the internal image.

The processor 180 may extract a feature vector of each food using the embodiment of FIGS. 18 and 19.

The processor 180 may determine whether the obtained food identification item is stored in the local DB (S2505).

When a plurality of feature vectors are extracted, the processor 180 may determine whether each feature vector is stored in a local DB.

The memory 170 of the refrigerator 10 may include a global DB and a local DB.

When the refrigerator 10 is shipped, the global DB is basically a built-in DB, and the local DB may be a DB created through edition of a product name by a user.

The global DB may be a DB received from the AI server 200.

The global DB may match and store a plurality of default food identification items and a plurality of default product names respectively corresponding to the plurality of default food identification items.

Each of the plurality of default food identification items may be a feature vector representing a food image.

The processor 180 may first determine whether a feature vector extracted from the photographed internal image is stored in the local DB. The reason for this is to preferentially consider a product name edited by the user, rather than a generally-designated product name when recognizing the product name of a food.

When the feature vector extracted from the internal image is stored in the local DB, the processor 180 may recognize a food corresponding to the feature vector as a product name stored in the local DB.

When the obtained food identification item is stored in the local DB, the processor 180 may determine whether the number of food items corresponding to the food identification item is two or more (S2507).

When a plurality of food items are included in the internal image, the processor 180 may determine whether two or more identical food items are present.

The processor 180 may determine whether a food identification item is stored in the local DB and there are a plurality of corresponding food identification items.

When the number of food items is one, the processor 180 may recognize the corresponding food item as a product name registered in the local DB (S2510).

When the number of the recognized food identification items is one, the processor 180 may read out the product name corresponding to the food identification item from the local DB, and recognize the product name as the product name of the food.

The processor 180 may reflect the stock of the food in food management information by using the recognized product name. The food management information may include information on the number, expiration date, and location of foods stored in the refrigerator 10.

When the number of the corresponding food items is two or more, the processor 180 may obtain registration positions at the time of registration of the corresponding food items and positions of two or more identical food items (S2509).

In an embodiment, when storing the edited product name of a food item, the processor 180 may also store the position at which the food item is placed in the local DB. The position may be named as a registration position.

The processor 180 may read the registration position of the corresponding food item from the local DB.

The processor 180 may obtain the position of each food item from the internal image in step S2503. The photographing direction of the internal image and the size of the photographed internal image may be constant.

When the internal image has a rectangular shape, the processor 180 may extract coordinate information where each food item is located.

The processor 180 may extract one or more coordinates corresponding to the shape of each food item.

The processor 180 may obtain the degree of overlap for each food item based on a registration position and positions of two or more identical food items, and determine whether the obtained degree of overlap is equal to or greater than a threshold (S2511).

In an embodiment, the processor 180 may compare the registered position with each of the positions of two or more identical food items, and may determine the identical food that is closest to the registration position among two or more identical food items. The processor 180 may recognize a product name of the determined identical food as the product name stored in the local DB.

To this end, first, the processor 180 may obtain the degree of overlap by comparing the registration position stored in the local DB with a position of each of the two or more food items.

The processor 180 may determine whether the degree of overlap is greater than the threshold by comparing each degree of overlap with the threshold. The threshold may represent a value that is a reference for classifying any one food item among a plurality of identical food items as a food item registered in the local DB.

A method of setting a threshold will be described later.

When there is a food item having a degree of overlap equal to or greater than the threshold, the processor 180 may recognize a product name of the food item having the degree of overlap equal to or greater than the threshold as a product name registered in the local DB (S2510).

When there are one or more food items having a degree of overlap equal to or greater than the threshold, the processor 180 may determine the product names of the one or more food items as product names registered in the local DB.

If there is no item having a degree of overlap greater than or equal to the threshold for each of the two or more food items, the processor 180 may recognize a food item closest to the registration position among two or more identical food items as a product name registered in the local DB (S2513).

The processor 180 may calculate a distance between the center point of the registration position and the center point of each of two or more identical food items when there is no food item having a degree of overlap equal to or greater than the threshold.

According to a calculation result, the processor 180 may obtain a food item corresponding to the shortest distance among distances between the center point of the registration position and the center points of the two or more identical food items. The processor 180 may determine the product name of the obtained food item as the product name stored in the local DB.

On the other hand, in step S2505, the processor 180 may determine whether a food identification item is stored in the global DB when the obtained food identification item is not stored in the local DB (S2515).

The global DB may store a plurality of food identification items and a plurality of product names respectively corresponding to the plurality of food identification items.

In an embodiment, the global DB may store food identification items and product names that have not been edited by a user.

When the food identification item is stored in the global DB, the processor 180 may recognize a food item corresponding to the food identification item as a product name registered in the global DB (S2517).

If the food identification item is not stored in the global DB, the processor 180 may display a food registration screen for registering the product name of the food (S2519).

In an embodiment, the food registration screen may be a screen for newly registering a product name of a food item.

If the food product name editing screen 2210 of FIG. 23 is a screen for changing a product name of a previously-stored food item, in step S2519, the food registration screen may be a screen for newly storing a food item that have not been previously stored and a product name of the food item.

As described above, according to an embodiment of the present disclosure, a product name of a food may be edited to suit the user's preference. Accordingly, the product name of the food is stored according to the user's preference, and food management may be performed according to the user's preference.

In the following embodiment, there is given a description for a process in which the product name of a food in the refrigerator 10 is modified by the user's editing and when the identical food is stored later, the product name of the food is recognized as the product name modified by the user.

Figure 26:
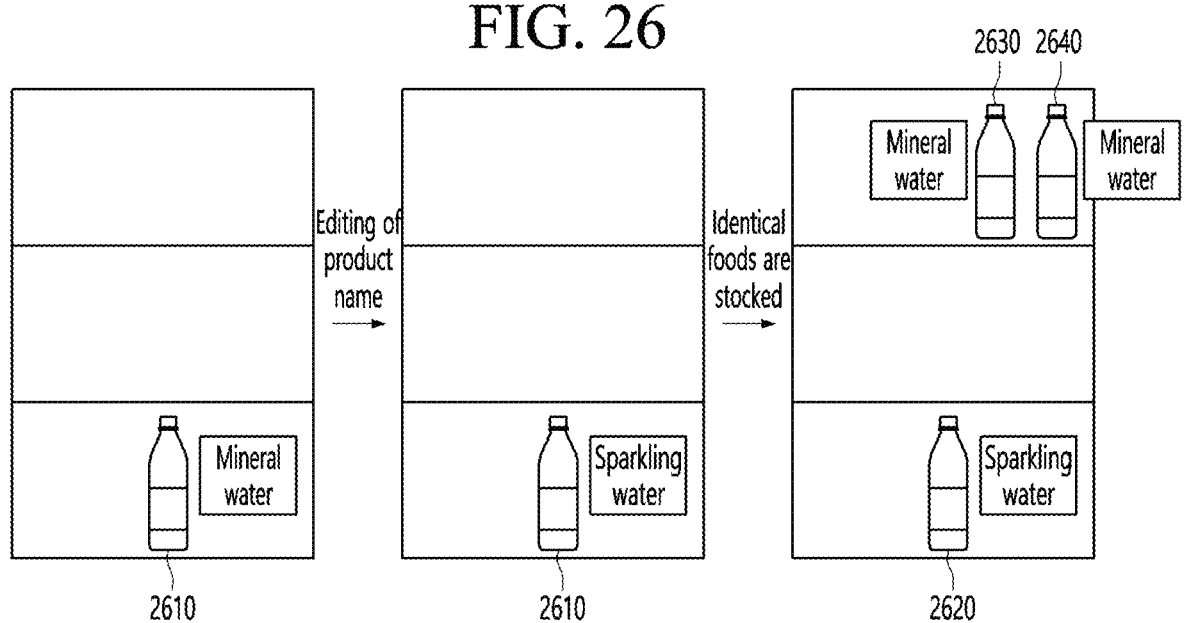
FIG. 26 is a diagram for describing handling when identical foods are stocked after a product name of a food is modified by a user according to an embodiment of the present disclosure.

FIG. 26 is a diagram for describing handling when identical foods are stocked after a product name of a food is modified by a user according to an embodiment of the present disclosure.

First, a food 2610 inside the refrigerator 10 has been recognized as product name <mineral water>.

The user has edited the product name of the food 2610 as <sparkling water> according to the process of S2101 to S2107 of FIG. 21.

Thereafter, it is assumed that food items 2620, 2630, and 2640 identical to the food 2610 are stocked in the refrigerator 10.

When the product name of the food 2610 is modified to <sparkling water>, the refrigerator 10 may store the registration position of the food 2610 together with the modified product name in a local DB.

When a plurality of foods 2620, 2630, and 2640 are stocked, the refrigerator 10 may recognize the product name of the food 2620 at a position similar to the registration position as <sparkling water> when editing the product name of the food 2610 and recognize product names of the foods 2630 and 2640 located at positions different from the registration position as an existing product name <mineral water>.

The refrigerator 10 may determine the food 2620 located in the same compartment as the food 2610 whose product name has been modified as being at a position similar to the registration position.

The refrigerator 10 may determine the foods 2630 and 2640 that are not located in the same compartment as the food 2610 whose product name has been modified as being at positions different from the registration position.

In another embodiment, the refrigerator 10 may calculate the degree of overlap based on the registration position of the food 2610 and the positions of the identical foods 2620, 2630, and 2640.

The refrigerator 10 may recognize a food whose calculated degree of overlap is equal to or greater than a threshold among the identical food items 2620, 2630, and 2640 as the modified product name <sparkling water> of the food 2610.

In another embodiment, the refrigerator 10 uses a product name of each of the identical foods 2620, 2630, and 2640 as the modified product name <sparkling water> of the food 2610, regardless of the registration position of the food 2610 whose product name is modified.

Whether the product name of each of the identical foods 2620, 2630 and 2640 is recognized as a modified product name of the food 2610 or whether only foods whose calculated degree of overlap is greater than or equal to the threshold is recognized in consideration of the registration position of the food 2610 as a modified product name may vary depending on the user's setting. On the menu, a menu item capable of performing such a setting function may be included.

On the other hand, the refrigerator 10 may identify a received food according to the recognition of the product name of the food, and obtain a food storage state based on the identification result. The refrigerator 10 may display the food storage state on the transparent display 14-1.

The refrigerator 10 may display the food storage state on the transparent display 14-1 after the outer door is completely closed.

Figure 27:
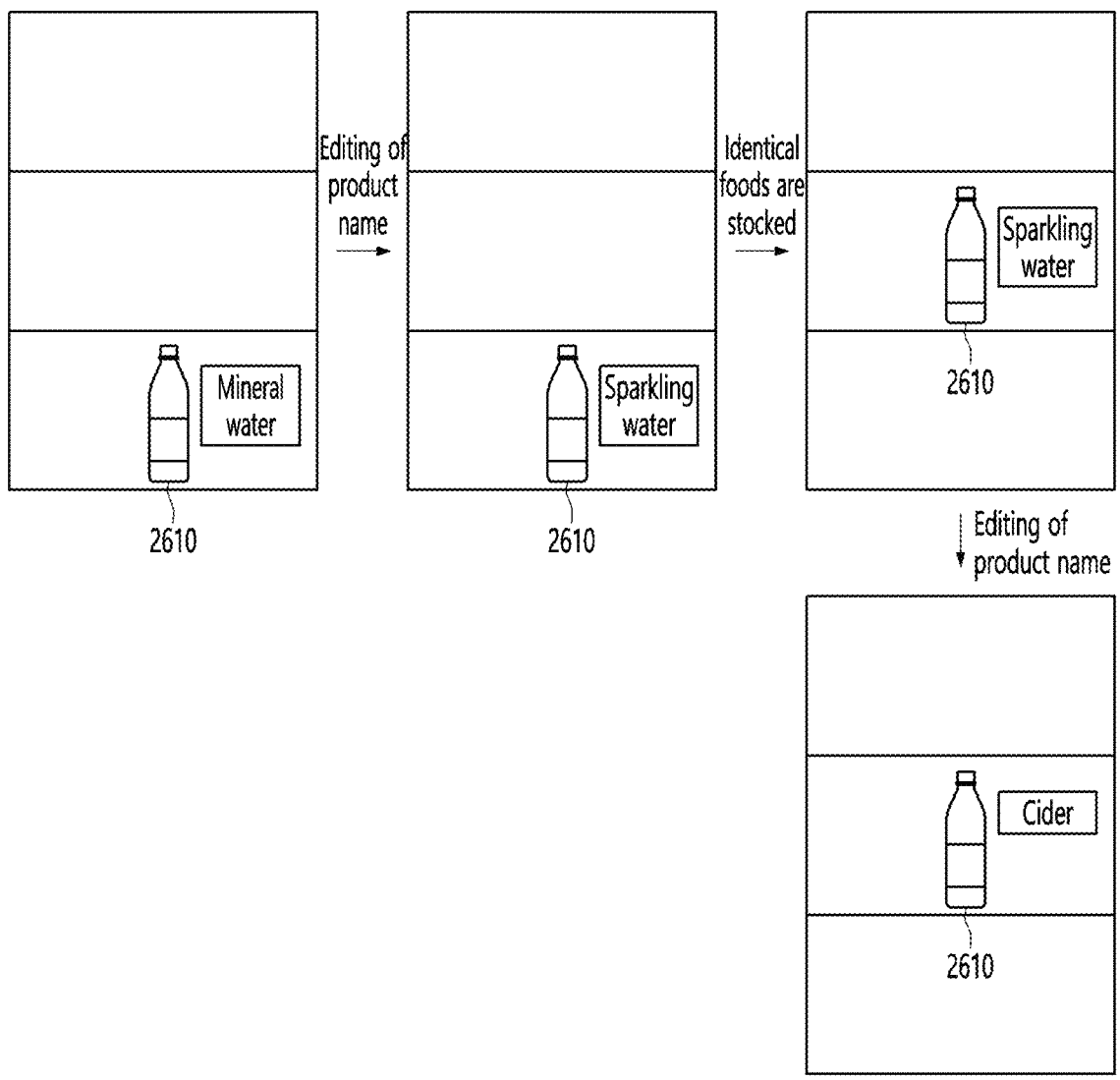
FIG. 27 is a diagram for describing a process of modifying a product name of a food multiple times by a user according to an embodiment of the present disclosure.

FIG. 27 is a diagram for describing a process of modifying a product name of a food multiple times by a user according to an embodiment of the present disclosure.

Referring to FIG. 27, firstly, the user inputs the product name of the food 2610 to <sparkling water> according to the process of S2101 to S2107 of FIG. 21.

Thereafter, when an identical product 2610 is stocked, the refrigerator 10 may recognize the product name of the product 2610 as <sparkling water>. Thereafter, the user may secondly modify the product name of the product 2610 to <Cider>.

The refrigerator 10 may store the product name modified to <Cider> and a product identification item of the corresponding product 2610 in the local DB.

As described above, according to the embodiment of the present disclosure, the user may modify the product name of a food that has been modified once several times to suit his or her preference to manage the product name of the food.

Figure 28:
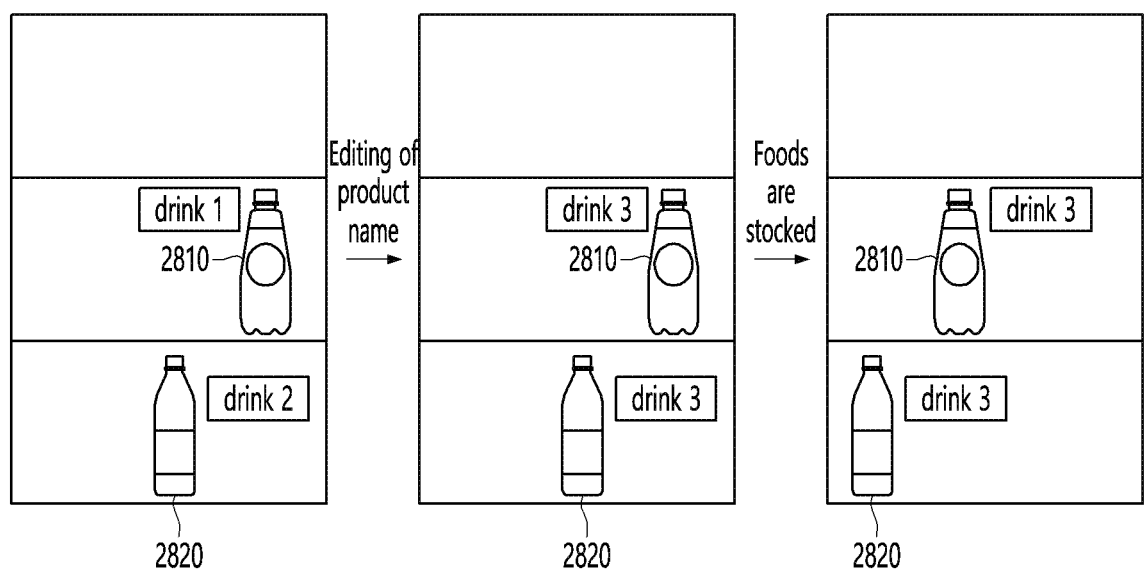
FIG. 28 is a diagram for describing a process of setting the same product name to different foods according to an embodiment of the present disclosure.

FIG. 28 is a diagram for describing a process of setting the same product name to different foods according to an embodiment of the present disclosure.

Referring to FIG. 28, a first food 2810 is recognized as <drink 1> and a second food 2830 is recognized as <drink 2>. Initially, in the process of food recognition, the global DB may be used.

Thereafter, it is assumed that the user has modified the product name of the first food 2810 from <drink 1> to <drink 3>, and the product name of the second food 2820 from <drink 2> to <drink 3>.

When the first food 2810 and the second food 2820 are restocked after the first food 2810 and the second food 2820 are drawn out, the refrigerator 10 may recognize the product name of the first food 2810 as <drink 3> and the product name of the second food 2820 as <drink 3>.

In this way, the user may manage the foods according to the user's preference by modifying the same type of foods into the same product name.

Figure 29:
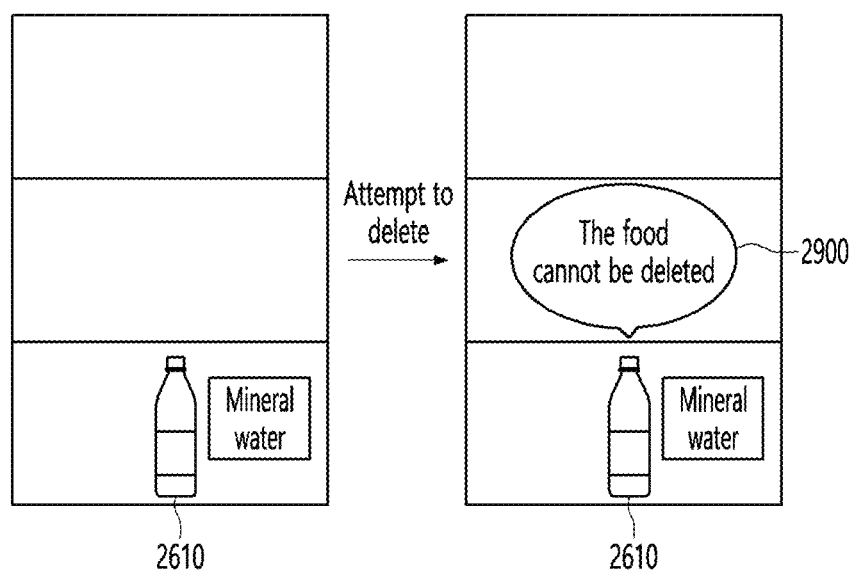
FIGS. 29 and 30 are diagrams for describing a scenario related to deletion of product names of foods according to an embodiment of the present disclosure.
Figure 30:
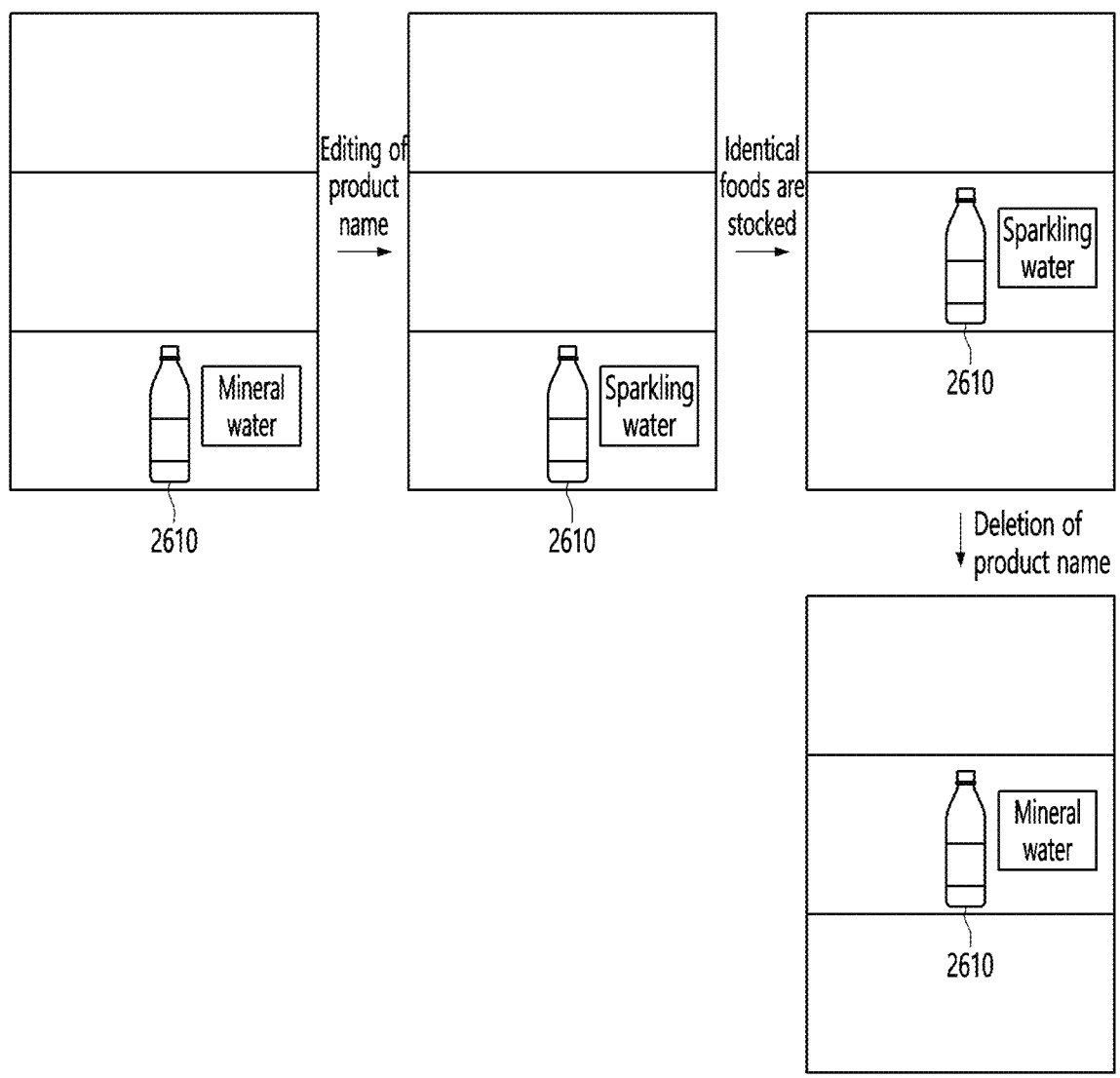

FIGS. 29 and 30 are diagrams for describing a scenario related to deletion of product names of foods according to an embodiment of the present disclosure.

In particular, FIG. 29 is a scenario related to deletion of product names of foods registered in the global DB, and FIG. 30 is a scenario related to deletion of product names of foods registered in the local DB.

Referring to FIG. 29, a product name of the food 2610 stored in the global DB is <mineral water>.

When the refrigerator 10 receives a user input for deleting the product name <mineral water> of the food 2610, the refrigerator 10 may display a notification 2900 indicating that the product name of the food cannot be deleted on the transparent display 14-1.

That is, the product name stored in the global DB cannot be deleted.

Referring to FIG. 30, there is shown a case where the product name of the food 2610 is edited from <mineral water> to <sparkling water> by a user's modification input. When receiving a user input for deleting the product name of <sparkling water>, the refrigerator 10 may delete the product name of <sparkling water>. At the same time, the refrigerator 10 may change the product name of the food 2610 to <mineral water> stored in the global DB.

That is, when the product name of the food modified by the user input is deleted, the refrigerator 10 may recognize the product name of the food as the product name stored in the global DB.

Figure 31:
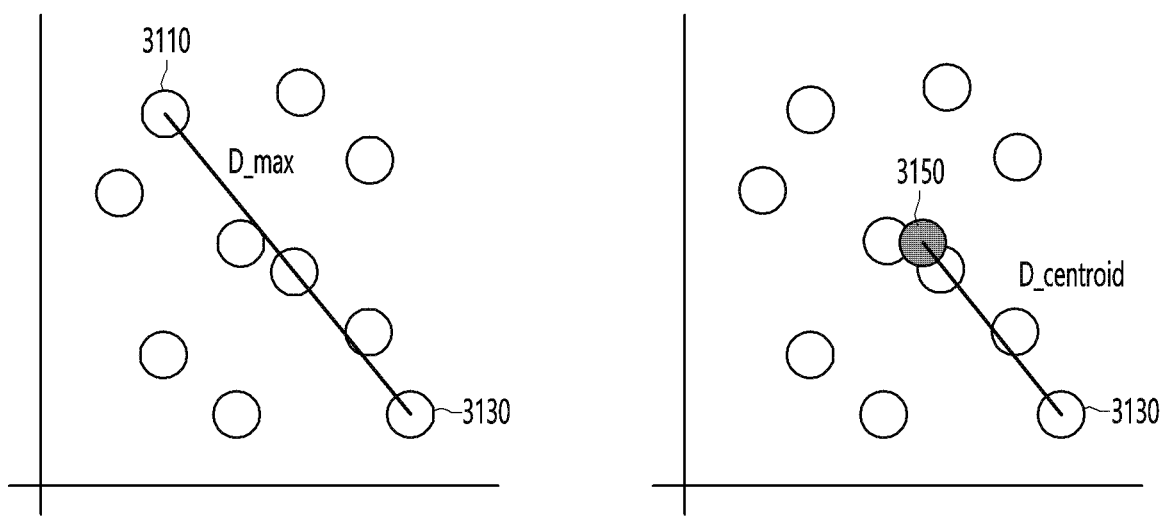
FIG. 31 is a diagram for describing a process of setting a reference value used to classify food items registered in a local DB when two or more identical food items stored in a local DB are extracted according to an embodiment of the present disclosure.

FIG. 31 is a diagram for describing a process of setting a reference value used to classify food items registered in a local DB when two or more identical food items stored in a local DB are extracted according to an embodiment of the present disclosure.

Referring to FIG. 31, it is assumed that ten identical foods are detected from a photographed image.

First, the processor 180 may arrange positions respectively corresponding to ten foods in a two-dimensional space.

Each of the ten positions may be represented by a vector.

The processor 180 may calculate the maximum distance D_max, which is the farthest distance between two positions 3110 and 3130 among the ten positions. D_max may represent a distance between two food images that are the farthest from each other obtained from an internal image.

Thereafter, the processor 180 may calculate an intermediate distance D_centroid between the positions 3130 that are farthest from the position 3150 corresponding to the intermediate vector located at the center of a 2D space.

The processor 180 may set a reference value "a" between the calculated maximum distance D_max and the intermediate distance D_centroid.

The reference value "a" may be used as a threshold when determining whether the degree of overlap between a registration position of the food and a position of a stocked food is greater than or equal to the threshold in the case of editing the product name.

Figure 32:
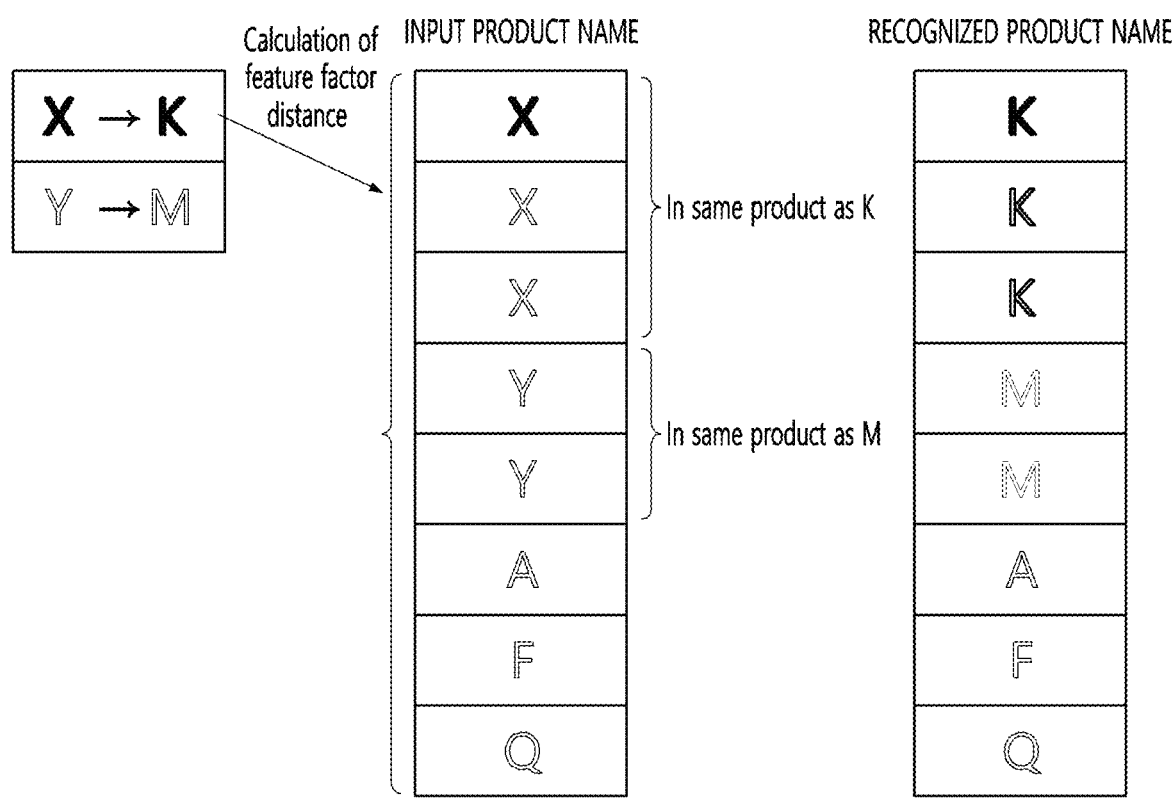
FIGS. 32 and 33 are diagrams for describing a process of processing a product name of each food when a plurality of foods identical to a food having a product name edited by a user are received according to an embodiment of the present disclosure.
Figure 33:
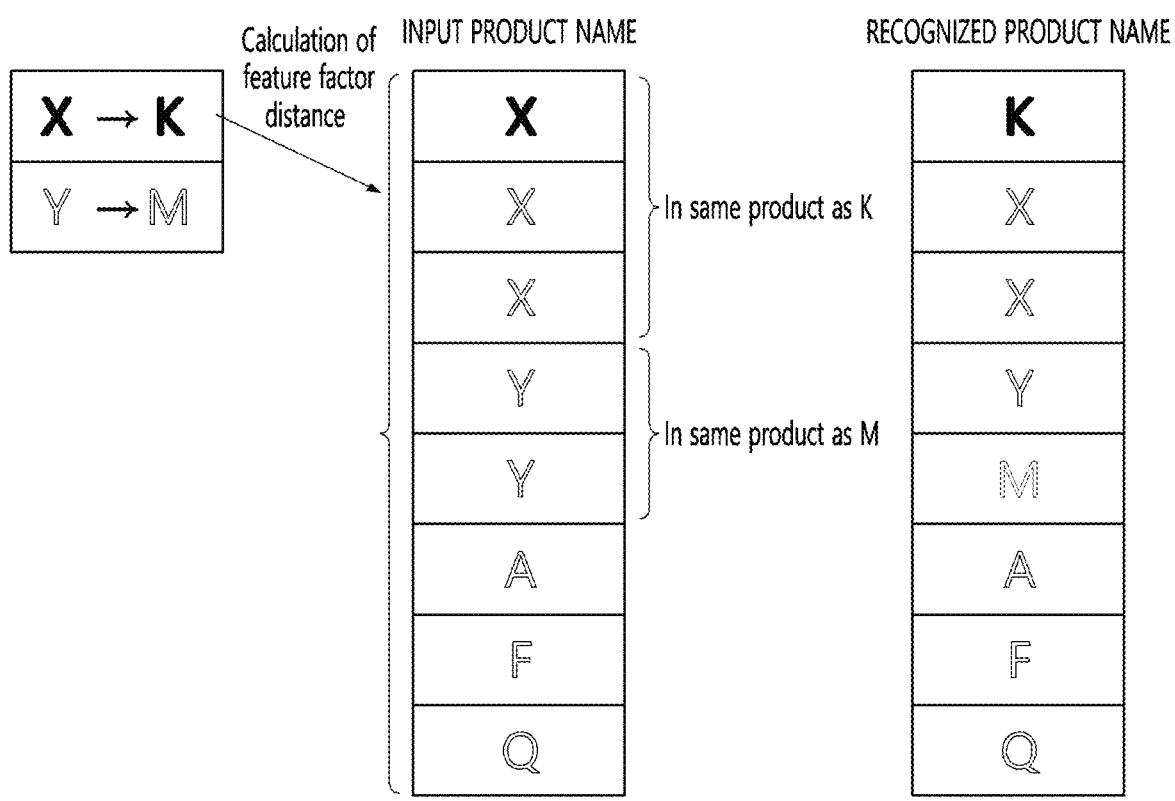

FIGS. 32 and 33 are diagrams for describing a process of processing a product name of each food when a plurality of foods identical to a food having a product name edited by a user are received according to an embodiment of the present disclosure.

In particular, FIG. 32 is a diagram for describing an example of recognizing all of the product names of the plurality of foods as the edited product name when a plurality of foods identical to the food having the product name edited by the user are received.

FIG. 33 is a diagram for describing an example of recognizing only the product name of one of the plurality of foods as the edited product name when a plurality of foods identical to the food having the product name edited by the user are received.

In FIGS. 32 and 33, it is assumed that the product name of a first food stored in the global DB is "X", and the product name of the first food, modified by the user and stored in the local DB is "K".

In addition, it is assumed that the product name of a second food stored in the global DB is "Y", and the product name of the second food modified by the user and stored in the local DB is "M".

In addition, in FIGS. 32 and 33, the product name of a third food whose product name has not been modified by the user is A, the product name of a fourth food whose product name has not been modified by the user is F, and the product name of a fifth food whose product name has not been modified by the user is "Q".

The product names of the third, fourth and fifth foods are stored only in the global DB.

In addition, in FIGS. 32 and 33, it is assumed that three first foods, two second foods, one third food, one fourth food, and one fifth food are stocked in the refrigerator 10.

A description will be given with reference to FIG. 32.

The refrigerator 10 may recognize the product names of the three first foods stocked as the modified "K", and recognize the product names of the two second foods stocked as the modified "M".

The refrigerator 10 may calculate a distance between a first feature vector stored in the local DB and a feature vector of the first food, and if the calculated distance is less than a preset distance, recognize the first food as the product name "K" corresponding to the first feature vector stored in the local DB.

Similarly, the refrigerator 10 may calculate a distance between a second feature vector stored in the local DB and a feature vector of the second food, and if the calculated distance is less than a preset distance, recognize the second food as the product name "M" corresponding to the second feature vector stored in the local DB.

That is, the refrigerator 10 may recognize the product name of an identical food as a modified product name using the local DB.

In addition, the refrigerator 10 may recognize the product names of the third, fourth, and fifth foods as a product name stored in the global DB using the global DB.

Next, a description will be given with reference to FIG. 33.

The refrigerator 10 may recognize a product name of any one of the three first foods stocked as the modified "K", and recognize a product name of any one of the two second foods stocked as the modified "M".

That is, the refrigerator 10 may recognize only one product name among the identical foods as a modified product name using the local DB.

The refrigerator 10 may recognize the product name of one of the three identical first foods, which is closest to the registration location of a registered food, as "K" which is the modified product name, when editing a product name by the user, and recognize the product names of the remaining first foods as "X" which is the product name before modification.

Likewise, the refrigerator 10 may recognize the product name of one of the two identical second foods, which is closest to the registration location of a registered food, as "M" which is the modified product name, when editing a product name by the user, and recognize the product name of the remaining second food as "Y" which is the product name before modification.

In addition, the refrigerator 10 may recognize the product names of the third, fourth, and fifth foods as a product name stored in the global DB using the global DB.

The product name recognition method of FIG. 32 and the product name recognition method of FIG. 33 may be set differently on a menu according to a user's settings.

The present disclosure described above may be embodied as computer readable codes on a medium in which a program is recorded. The computer-readable medium includes all kinds of recording devices in which data readable by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like. The computer may also include the processor 180 of an artificial intelligence device.

What is claimed is:

1. A refrigerator comprising:
a storage compartment;
an outer door;
a transparent display disposed on the outer door;
one or more cameras disposed in the outer door;
a memory configured to store a global database (DB) and a local DB, wherein the global DB is configured to store a plurality of default food identification items and the local DB is configured to store a food identification item respectively corresponding to edited product names; and
a processor configured to:
cause the one or more cameras to photograph an internal image of the storage compartment,
obtain one or more food identification items using the photographed internal image, and
recognize one or more product names of the obtained one or more food identification items as product names of the stored food identification items in the local DB based at least in part on a determination that the obtained one or more food identification items is stored in the local DB, wherein the processor is further configured to:

cause the transparent display to display a food product name editing screen comprising a plurality of food items recognized through the photographed internal image, receive an input for editing a product name of a food item selected from among the plurality of food items, and store, in the local DB, the product named edited according to the received input to match with a food identification item corresponding to the selected food item.

2. The refrigerator of claim 1, wherein the processor is further configured to recognize a product name of one of a plurality of identical food items as a product name stored in the local DB based at least in part on a determination that a plurality of identical food identification items are stored in the local DB.

3. The refrigerator of claim 2, wherein the processor is further configured to recognize a product name of a food item positioned closest to a registration position indicating a position where the food item is placed as a product name stored in the local DB among the plurality of identical food items when editing product names of food items.

4. The refrigerator of claim 3, wherein the processor is further configured to:

obtain positions of the plurality of identical food items when editing product names of food items;

determine whether a degree of overlap for each position is greater than or equal to a threshold by comparing each of the obtained positions of the plurality of identical food items with the registration position of the recognized product name;

recognize the product name of the food item closest to the registration position among the plurality of identical food items as a product name stored in the local DB based at least in part on a determination that the determined degree of overlap for each position is less than the threshold; and recognize the product name of the food item as a product name stored in the local DB based at least in part on a determination that the determined degree of overlap for each position is greater than or equal to the threshold.

5. The refrigerator of claim 2, wherein the processor is further configured to recognize a product name of each of the plurality of identical food items as a product name stored in the local DB.

6. The refrigerator of claim 1, wherein the processor is further configured to determine whether the obtained one or more food identification items are stored in the global DB based at least in part on a determination that the obtained one or more food identification items are not being stored in the local DB.

7. The refrigerator of claim 6, wherein the processor is further configured to recognize corresponding product names of the obtained one or more food identification items as product names of matched default food identification items based at least in part on a determination that the obtained one or more food identification items matches the plurality of default food identification items stored in the global DB.

8. The refrigerator of claim 6, further comprising:
a transparent display disposed on the outer door,
wherein the processor is further configured to cause the transparent display to display a food registration screen for registration of food items based at least in part on a determination that the obtained one or more food identification items are not stored in the global DB.

9. The refrigerator of claim 1, wherein each default food identification item and the food identification item are stored as feature vectors.

10. The refrigerator of claim 1, further comprising:
a sensor configured to detect an opening angle of the outer door,
wherein the processor is further configured to determine whether the opening angle of the outer door is opened to a preset angle based at least in part on a detection that the outer door is closing, wherein the internal image of the storage compartment is photographed when the opening angle of the outer door reaches the preset angle.

11. The refrigerator of claim 10, wherein the outer door further comprises:
an outer case,
a door liner mounted on a rear side of the outer case,
a door dike disposed to be surrounded along outer edges of the door liner, and
an outer basket detachably coupled to the door dike for storing food on the rear side of the outer case, wherein the one or more cameras are disposed on the door dike.

12. The refrigerator of claim 1, further comprising:
a transparent display disposed on the outer door,
wherein the processor is further configured to:
obtain a food storage state based on a deposit or withdrawal of food based at least in part on the recognized product name, and
cause the transparent display to display the obtained food storage state.

13. The refrigerator of claim 12, wherein the food storage state is displayed on the transparent display after the outer door is completely closed.

14. A method of operating a refrigerator, the refrigerator comprising a storage compartment, an outer door, a transparent display disposed on the outer door, one or more cameras provided in the outer door, and a memory configured to store a global database (DB) and a local DB, wherein the global DB is configured to store a plurality of default food identification items and the local DB is configured to store a food identification item respectively corresponding to edited product names, the method comprising:

photographing an internal image of the storage compartment through the more or more cameras;

obtaining one or more food identification items using the photographed internal image; and recognizing one or more product names of the obtained one or more food identification items as product names of the stored food identification items in the local DB based at least in part on a determination that the obtained one or more food identification items is stored in the local DB, displaying, on the transparent display, a food product name editing screen comprising a plurality of food items recognized through the photographed internal image, receiving an input for editing a product name of a food item selected from among the plurality of food items, and storing, in the local DB, the product named edited according to the received input to match with a food identification item corresponding to the selected food item.

15. The method of claim 14, further comprising recognizing a product name of one of a plurality of identical food items as a product name stored in the local DB based at least in part on a determination that a plurality of identical food identification items are stored in the local DB.

16. The method of claim 15, further comprising recognizing a product name of a food item positioned closest to a registration position indicating a position where the food item is placed as a product name stored in the local DB among the plurality of identical food items when editing product names of food items.

17. The method of claim 16, further comprising:
obtaining positions of the plurality of identical food items when editing product names of food items;
determining whether a degree of overlap for each position is greater than or equal to a threshold by comparing each of the obtained positions of the plurality of identical food items with the registration position of the recognized product name;
recognizing the product name of the food item closest to the registration position among the plurality of identical food items as a product name stored in the local DB based at least in part on a determination that the determined degree of overlap for each position is less than the threshold; and
recognizing the product name of the food item as a product name stored in the local DB based at least in part on a determination that the determined degree of overlap for each position is greater than or equal to the threshold.

18. The method of claim 15, further comprising recognizing a product name of each of the plurality of identical food items as a product name stored in the local DB.

19. The method of claim 14, further comprising determining whether the obtained one or more food identification items are stored in the global DB based on the obtained one or more food identification items not being stored in the local DB.

* * * * *